United States Patent
Gruet et al.

(10) Patent No.: US 9,130,715 B2
(45) Date of Patent: Sep. 8, 2015

(54) MATCHING SUBCARRIES POWER IN A BROADBAND NETWORK COLLOCATED WITH A NARROWBAND NETWORK

(75) Inventors: Christophe Gruet, Montigny le Bretonneux (FR); Eric Georgeaux, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 133 days.

(21) Appl. No.: 14/002,748

(22) PCT Filed: Mar. 2, 2012

(86) PCT No.: PCT/EP2012/053686
§ 371 (c)(1),
(2), (4) Date: Sep. 3, 2013

(87) PCT Pub. No.: WO2012/119964
PCT Pub. Date: Sep. 13, 2012

(65) Prior Publication Data
US 2013/0343318 A1    Dec. 26, 2013

(30) Foreign Application Priority Data
Mar. 4, 2011 (FR) .................... 11 51767

(51) Int. Cl.
| H04W 4/00 | (2009.01) |
| H04B 7/212 | (2006.01) |
| H04L 5/00 | (2006.01) |
| H04L 25/02 | (2006.01) |
| H04L 27/00 | (2006.01) |
| H04W 72/04 | (2009.01) |

(52) U.S. Cl.
CPC .............. *H04L 5/0048* (2013.01); *H04L 5/001* (2013.01); *H04L 25/0224* (2013.01); *H04L 27/0006* (2013.01); *H04W 72/042* (2013.01); *H04W 72/0453* (2013.01)

(58) Field of Classification Search
CPC .... H04W 72/04; H04W 72/042; H04W 88/08
USPC .................... 370/324, 329, 341, 350
See application file for complete search history.

(56) References Cited

U.S. PATENT DOCUMENTS

| 8,654,718 B2 * | 2/2014 | Kwak et al. .................... 370/329 |
| 2011/0045836 A1 | 2/2011 | Phan |
| 2011/0077015 A1 * | 3/2011 | Saily et al. .................... 455/450 |

* cited by examiner

*Primary Examiner* — Samina Choudhry
(74) *Attorney, Agent, or Firm* — Steven M. Greenberg, Esq.; CRGO Law

(57) ABSTRACT

In order to acquire first subbands in at least a central band of a broad frequency band, in which subbands frames are transmitted by a base station (BSBB) of a broadband network (RBB) which is co-located with a network (RNB) having narrow subbands comprised in the broadband, a mobile (MBBB) which does not know the distribution of the subbands correlates subsequences of a generated reference signal with subsequences which are respectively detected in the subbands and compares correlation coefficients against a threshold. By knowing the distribution of the first subbands, the mobile is able to process the signaling transmitted by the base station, in order to access allocated resources, after a synchronization phase.

11 Claims, 7 Drawing Sheets

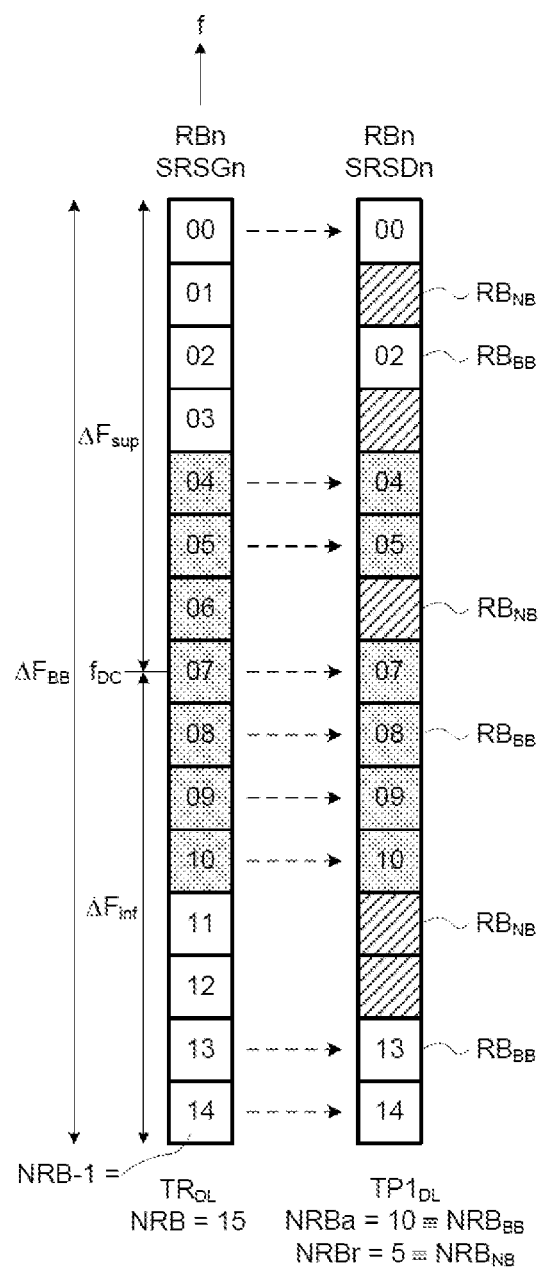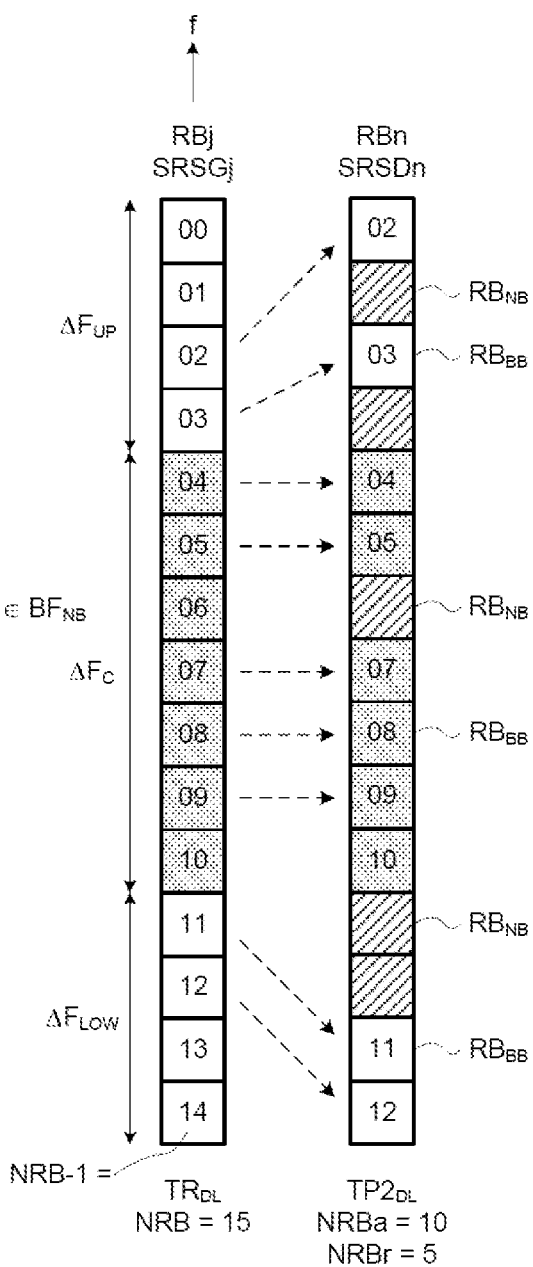

MATCHING SUBCARRIES POWER IN A BROADBAND NETWORK COLLOCATED WITH A NARROWBAND NETWORK

CROSS-REFERENCE TO RELATED APPLICATIONS

This application is a §371 national phase entry of International Application No. PCT/EP2012/053686, filed Mar. 2, 2012, which claims priority to French Patent Application No. 1151767, filed Mar. 4, 2011.

The present invention relates generally to the synchronisation phase of a mobile connected to a broadband network which shares a band with a narrowband network.

A broadband network is, for example, a network for third-generation or fourth-generation mobiles which is defined by the Third Generation Partnership Project (3GPP) based, for example, on evolved-UMTS terrestrial radio access technology (E-UTRA), sometimes also referred to as "long term evolution" (LTE), and supports radio links to mobiles of the orthogonal frequency-division multiple access (OFDMA) type. In a broadband network, a base station organises and allocates the available traffic radio resources into both the frequency domain and the time domain as resource blocks in frames which are divided variably among active radio links to mobiles, also known as user equipment, covered by the base station. As a mobile connects to the base station, the mobile has to detect synchronisation signals and a reference signal to identify radio resources attributed to it by the base station for transmitting and receiving traffic data via uplinks and downlinks. Reference will be made in the description below to the frequency-division duplex (FDD) mode in which the base station transmits and receives in at least two blocks, which are allocated to a mobile, of two different subbands in, respectively, uplink and downlink frames.

A narrowband network is, for example, a narrowband professional mobile radio (PMR) network of, for example, one of the following types: digital mobile radio (DMR), terrestrial trunked radio (TETRA), TETRAPOL or P25. It is used for public security services. In a narrowband network, professional mobiles are grouped together so that each mobile belonging to a group is able to transmit data to other mobiles belonging to the group and to receive the data from any other mobile belonging to the group via the infrastructure of the narrowband network. The mobiles of a group are only able to communicate with each other. In a narrowband network base station, radio resources are divided as frequency subbands, of which the number and transmission speeds are determined to meet the requirements of the professional mobiles in terms of communication resources and radio coverage in a secure manner.

When an LTE broadband network shares its frequency band with a narrowband network, frequency band subbands of the LTE broadband network are attributed to the narrowband network so that the two networks coexist in the broad frequency band. The number of subbands of the LTE network which are attributed to the narrowband network is approximately identical in each of the sectors of a base station, constituting a node B of the LTE network. The precise position of the subbands which are extracted from the LTE network and attributed to the narrowband network depends on the site of the base station and is dictated by the frequency scheduling in the narrowband network.

To ease management of the LTE network, carriers attributed to the narrowband network can be regrouped to form subbands each having a spectral occupation which is either lower than or equal to that of a resource block in the frame of the LTE network. The base station and the mobiles connected thereto of the broadband network cannot receive and transmit data, including signalling, on downlinks and uplinks in the carrier subbands attributed to the narrowband network. In other words, a mobile or a base station of the LTE network never communicates via a subcarrier block which includes a carrier subband attributed to the narrowband network.

However, the "holes" in the LTE network broadband which are created by the resource blocks occupied by carriers attributed to the narrowband network directly affect the signalling of the LTE network, particularly the signalling in the downlink frames which is necessary for the synchronisation of the mobiles and for the allocation of resource blocks to the mobiles by the base station of the LTE network. The affected signalling channels in a downlink frame are, in particular, physical channels, such as primary synchronisation signals (PSS) and secondary signalisation signals (SSS) (also known as primary synchronisation channels (PSCH) and secondary synchronisation channels (SSCH)), a reference signal (RS) used for the synchronisation and the estimation of the radio channel by a mobile, a physical broadcast channel (PBCH) used for information which is specific to a cell, and a physical downlink control channel (PDCCH) used for the allocation of traffic radio blocks to mobiles. These signalling channels extend over several dozen to several hundred subcarriers, depending on the frequency bandwidth of the LTE network.

The extraction of subbands in the LTE network broadband means that a mobile is unaware of the precise distribution of the subbands in the broadband which are used to transmit signalling in a downlink frame during a connection and synchronisation phase. The suppression of groups of radio resource elements used, in particular, to allocate traffic radio blocks prevents mobiles from receiving any traffic data whatsoever.

The invention addresses the problem of a mobile precisely locating the subbands which are reserved for a narrowband network and missing from the downlink frames transmitted by a broadband network base station, in order to access the signalling which is suitable for resource allocation.

For this purpose, a method in a mobile for acquiring first subbands in at least a portion of a broad frequency band, a first base station transmitting frames which are distributed temporally and in the first subbands and support a message including the number of subbands in the broadband, and being located in the vicinity of a second base station transmitting in second subbands which are included in the broad frequency band and differ from the first subbands, at least one of the second subbands being included in the broadband portion, and the subbands having the same width, is characterised in that, in the mobile, it comprises:

dividing a reference signal generated in the mobile into generated subsequences which are associated respectively with subbands of the broadband of which the width is deduced from the number of subbands in the message;

detecting resource elements included at predetermined positions in all the subbands of the broadband portion for each frame transmitted by the first base station;

grouping resource elements respectively detected in the subbands of the broadband portion into detected subsequences;

determining coefficients which are representative of correlations between the generated subsequences and the detected subsequences respectively associated with the subbands of the broadband portion; and acquiring the positions of the first subbands in the broadband portion for associated coefficients which exceed a predetermined threshold and the positions of the second subbands in the broadband portion for associated coefficients which are at most equal to the predetermined threshold.

The above method allows the mobile to acquire the distribution of the first and second subbands in the broadband portion by detecting only the resource elements of the reference signal which are transmitted in the first subbands by the first base station of the broadband network and by ignoring the resource elements of the reference signal which were unable to be transmitted in the second subbands as a result of these being reserved for the second base station of a narrowband network. The mobile accurately locates the missing second subbands which form "holes" in the downlink frames during the synchronisation phase as the mobile connects to the first base station. When the broadband portion is a central band of the broad frequency band which supports signalling channels, the mobile is then capable of recovering all the signalling necessary for the allocation of resource blocks by the first base station.

According to a first embodiment, the broadband portion is the broad frequency band itself. The detection, grouping, determination and acquisition steps are performed on all the subbands of the broad frequency band in order to acquire the positions of the first subbands in the broadband for associated coefficients which exceed the predetermined threshold and positions of the second subbands in the broadband for associated coefficients which are at most equal to the predetermined threshold.

In a second embodiment, said broadband portion is a central band of the broad frequency band. The distribution of the first and second subbands is also acquired in bands which are above and below the central band which make up, together with the central band, the broad frequency band according to the steps set out below.

Reference signal subsequences are transferred in the first base station which are to be distributed initially into all the subbands of the upper band of each frame and successively into the first subbands of the upper band of the frame in ascending frequency order, and reference signal subsequences which are to be distributed initially into all the subbands of the lower band of each frame and successively into the first subbands of the lower band of the frame in descending frequency order.

In the mobile, according to the second embodiment, the method comprises:
  detecting resource elements contained at predetermined positions in all the subbands of the upper and lower bands for the period of the received frame, and grouping the resource elements respectively detected in the subbands of the upper and lower bands into detected subsequences; and
  for each upper and lower band, the following steps which are repeated for each subband, starting with the lower subband of the upper band or with the upper subband of the lower band:
  determining a coefficient which is representative of the correlation between the generated subsequences associated with said each subband and the detected subsequence in said each subband;
  acquiring the position of said each subband as the first subband when the coefficient exceeds a second predetermined threshold, the subband which follows said each subband in the upper or lower band becoming said each subband for the next recurrence; and
  acquiring the position of said each subband as the second subband when the coefficient is at most equal to the second predetermined threshold, said each subband in the upper or lower band being maintained for the next recurrence.

The positions of the first and second subbands in the broad frequency band can be acquired more accurately and quickly by performing the following additional steps:
  detecting the number of first subbands in the broad frequency band in said message, and validating the first subbands occupying acquired positions if said subbands are equal in number to the detected number; or
  detecting the numbers of second subbands which are respectively in two complementary parts, such as, roughly, upper and lower halves, of the broad frequency band in said message, and validating the acquired positions of the first and second subbands if the numbers of second subbands occupying positions acquired in the upper half of the complementary parts are respectively equal to the detected numbers of second subbands in the complementary parts; or
  detecting the numbers of second subbands which are respectively in a central band and upper and lower bands making up the broad frequency band in said message, and validating acquired positions of the first and second subbands if the number of second subbands occupying positions acquired in the central band is equal to the detected number of second subbands in the central band, the number of second subbands occupying positions acquired in the upper band is equal to the detected number of second subbands in the upper subband and the number of second subbands occupying positions acquired in the lower band is equal to the detected number of second subbands in the lower band.

After acquiring the distribution of the first and second subbands, the mobile is able to replace the number of subbands in the broad frequency band with the number of first subbands occupying acquired positions and to renumber the first subbands occupying acquired positions, in order for the mobile to recognise, in the first subbands, a specific transmitted signalling and resource blocks allocated by the first base station.

The invention also relates to a mobile for acquiring first subbands in at least a portion of a broad frequency band, a first base station being capable of transmitting frames which are distributed temporally and in the first subbands and support a message including the number of subbands in the broadband, and capable of being located in the vicinity of a second base station capable of transmitting in second subbands which are included in the broad frequency band and differ from the first subbands, at least one of the second subbands being included in the broadband portion, and the subbands having the same width. The mobile is characterised in that it comprises:
  a means for dividing a reference signal generated in the mobile into generated subsequences which are associated respectively with subbands of the broadband of which the width is deduced from the number of subbands in the message;
  a means for detecting resource elements included at predetermined positions in all the subbands of the broadband portion for each frame to be transmitted by the first base station;
  a means for grouping resource elements respectively detected in the subbands of the broadband portion into detected subsequences;
  a means for determining coefficients which are representative of correlations between the generated subsequences and the detected subsequences respectively associated with subbands of the broadband portion; and a means for acquiring the positions of the first subbands in the broadband portion for associated coefficients which exceed a predetermined threshold and the positions of the second subbands in the broadband portion for associated coefficients which are at most equal to the predetermined threshold.

The invention also relates to a broadband radio-communications network comprising base stations and mobiles capable of implementing the steps of the method of the invention.

Finally, the invention relates to a computer program capable of being implemented in a mobile. The program is characterised in that it comprises instructions which carry out the method of the invention when the program is executed in the mobile.

Other features and advantages of the present invention will emerge more clearly upon reading the following description of a number of embodiments of the inventions which are given by way of non-limiting examples, with reference to the corresponding appended drawings, in which:

FIG. 7 is a frequential diagram of a "perforated" downlink frame according to an example of a first embodiment of the invention compared with a known LTE downlink frame;

FIG. 9 is a frequential diagram of a "perforated" downlink frame according to an example of a second embodiment of the invention compared with a known LTE downlink frame.

The following will refer to the signalling in a downlink radio frame $TR_{DL}$ of a broadband cellular radio-communications network $R_{BB}$ in frequency-division duplex FDD mode using LTE technology with reference to FIGS. 1 to 4.

Figure 1:
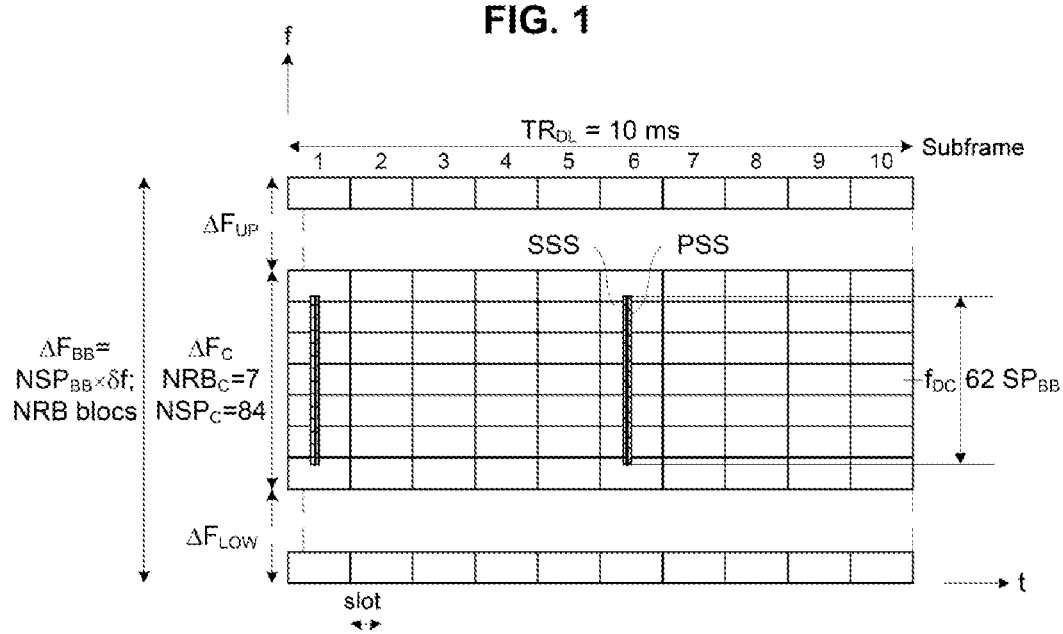
FIG. 1 is a time-frequency diagram of a known LTE downlink frame.
Figure 2:
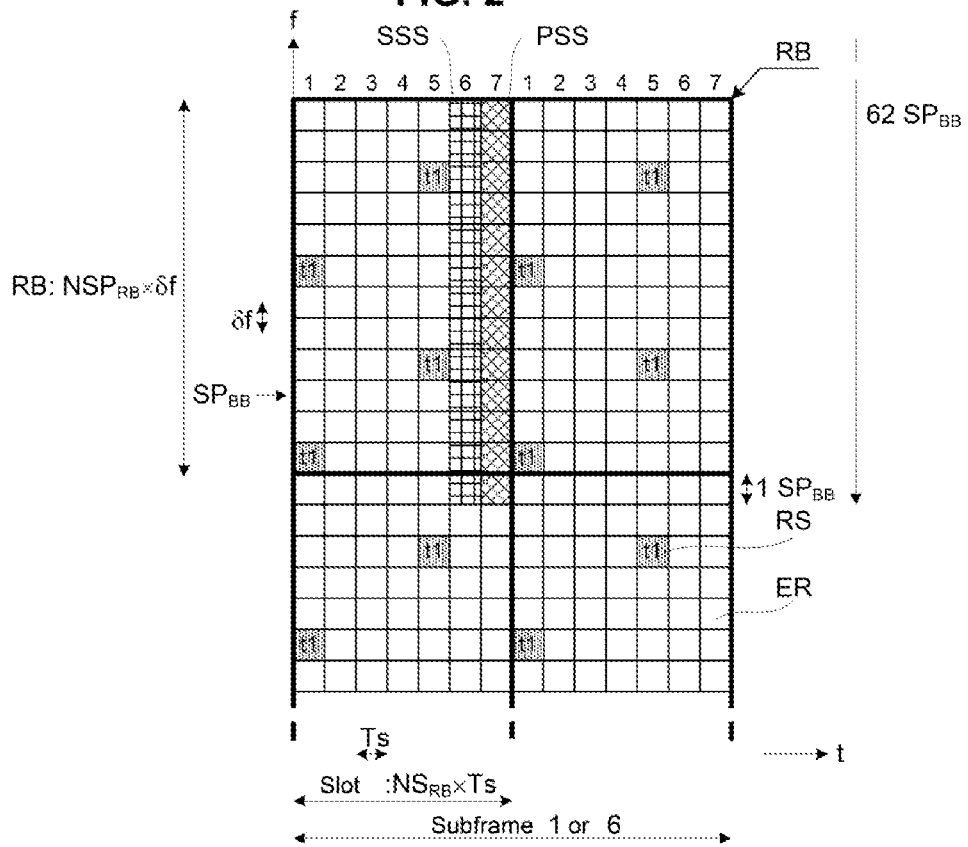
FIG. 2 is a time-frequency diagram of the first or sixth subframe of the LTE downlink frame detailed in two lower subbands of a central band.

As shown in the time-frequency (t-f) diagrams in FIGS. 1 and 2, the downlink signal structured as a downlink frame $TR_{DL}$ is carried by $NSP_{BB}$ subcarriers $SP_{BB}$ which are symmetrically distributed about a central frequency $f_{DC}$ which corresponds to the continuous component in baseband. Since the spacing between sub-carriers is equal to $\delta f$, the downlink signal occupies a predetermined useful frequency band $\Delta F_{BB} = NSP_{BB} \times \delta f$ comprising $NSP_{BB}$ subcarriers. The $NSP_{BB}$ subcarriers are distributed in NRB consecutive frequency subbands which each comprise $NSP_{RB}$ consecutive subcarriers $SP_{BB}$ in the width of a radio resource block RB. For example, a resource block comprises $NSP_{RB}=12$ subcarriers $SP_{BB}$ of width $\delta f=15$ kHz. The predetermined useful frequency band $\Delta F_{BB}$ comprises a central band $\Delta F_C$ having $NSP_C$ subcarriers which are symmetrically distributed about the central frequency $f_{DC}$ and supporting common signalling channels mixed with transport channels. As in the preamble of the description, "signalling channels" refers to the synchronisation signals and control or broadcast channels or indicators, such as the PBCH, PDCCH, PCFICH channels. On either side of the central band $\Delta F_C$, an upper band $\Delta F_{UP}$ and a lower band $\Delta F_{LOW}$ of identical size are assigned to transport channels. In the time domain, each resource block extends over $NS_{RB}=6$ or 7 radio resource elements ER, depending on the length of a normal or extended cyclical prefix, or $NS_{RB} \times NSP_{RB}$ radio resource elements ER via radio resource blocks RB. Each radio resource element ER is carried by a subcarrier $SP_{BB}$ and has a length which is equal to the period Ts of an orthogonal frequency-division multiplexing OFDM symbol. The radio frame $TR_{DL}$ lasts for 10 ms and is divided into 10 subframes of 1 ms comprising 2 time slots of 0.5 ms.

The NRB number of subbands, or resource blocks in the frequency domain, may be either even or odd depending on the frequency bandwidth $\Delta F_{BB}$. If NRB is even, the central frequency $f_{DC}$ is located between two resource blocks RB, and the central band $\Delta F_C$ may have $NRB_C=6$ resource blocks. If NRB is odd, the central frequency $f_{DC}$ is located at the centre of a central resource block, and the central band $\Delta F_C$ may have $NRB_C=7$ resource blocks. The example of frames shown in FIGS. 1 to 4, 7 and 9 relates to an odd number NRB of subframes, for example, for a frequency band $\Delta F_{BB}=3$ MHz, and the central band $\Delta F_C$ comprises $NSP_C=84$ subcarriers.

In the frame $TR_{DL}$, the signalling channels support the synchronisation and system information intended, in particular, for the allocation of transport channel resource blocks to mobiles $MB_{BB}$ by base stations $BS_{BB}$ in the broadband network $R_{BB}$. The resource blocks of the transport channels in the entire downlink radio frame $TR_{DL}$, over both the width of the band $\Delta F_{BB}$ and the length of the frame, are shared between the downlinks which are active between the mobiles $MB_{BB}$ and base stations $BS_{BB}$ of the network $R_{BB}$. The central band $\Delta F_C$ contains signalling channels, including synchronisation channels, which are mixed with transport channels, the other bands $\Delta F_{UP}$ and $\Delta F_{LOW}$ containing only transport channels. Radio resource elements ER at predetermined positions in the central band $\Delta F_C$ thus contain information from the signalling channels, the other positions of the central band containing transport channel resource elements for traffic data.

In the following we will refer to the processing of signalling channels in a mobile $MB_{BB}$ when said mobile is seeking to connect to a base station $BS_{BB}$ in the network $R_{BB}$ in order to synchronise with said base station and to detect the position of at least one transport channel resource block allocated to it by the base station $BS_{BB}$ in order to receive traffic data.

For example, for a cyclical prefix, the predetermined positions of the primary PSS and secondary SSS synchronisation signals in the central band are defined in the time domain by the penultimate and last symbol periods of the first slot of the first and sixth subframes, and in the frequency domain by the 62 subcarriers among the 84 which make up the central band $\Delta F_C$, symmetrically distributed about the central frequency $f_{DC}$. The PSS signal supports one of the 3 Zadoff-Chu orthogonal sequences which is the same in the first and sixth subframes, and the SSS signal supports one of the 168 binary sequences distributed in two different subsequences in the first and sixth subframes. At the commencement of the initial phase of synchronising an $MB_{BB}$ mobile, also known as user equipment, in the broadband network $R_{BB}$, the mobile monitors the radio interface between said network and a base station $BS_{BB}$, known as B node, of the network $R_{BB}$ and uses correlations both in the frequency domain on the 62 subcarriers of the central band $\Delta F_C$ and in the time domain on each slot of the frame for detecting the synchronisation sequences transmitted by the base station. This detection allows the mobile to achieve fine synchronisation and to detect and store an identifier Cell-Id, which is calculated from the rows of sequences detected in the PSS and SSS signals and identifies a radio cell covered by the base station $BS_{BB}$ to which the mobile is trying to connect.

In the following, a radio cell is likened to a sector when the base station has a plurality of sectors, for example three sectors.

The cell identifier Cell-Id is then used in the mobile to descramble various pieces of protected information in the signalling channels, such as PBCH, RS, PDCCH and PCFICH, which information is transmitted by the base station $BS_{BB}$ to the mobile $MB_{BB}$. Even if some resource blocks RB are missing from among the $NRB_C=7$ resource blocks of the central band $\Delta F_C$ supporting the PSS and SSS synchronisation signals in the frames, the mobile is capable of detecting the synchronisation sequences and, thus, the identifier Cell-Id of the radio cell.

After detecting the synchronisation signals, the mobile $MB_{BB}$ detects a reference signal RS which is specific to the radio cell identified by the detected identifier Cell-Id. For an antenna port t1, the reference signal RS1 is made up of a specific sequence which is distributed in resource elements occupying predetermined time and frequency positions in each of the blocks RB of the entire frame $TR_{DL}$, for example on the first and seventh subcarrier of the first symbol period and the fourth and tenth subcarriers of the fifth symbol period of each of these blocks, as shown in the radio resource elements labelled "t1" in FIG. 2.

Figure 3:
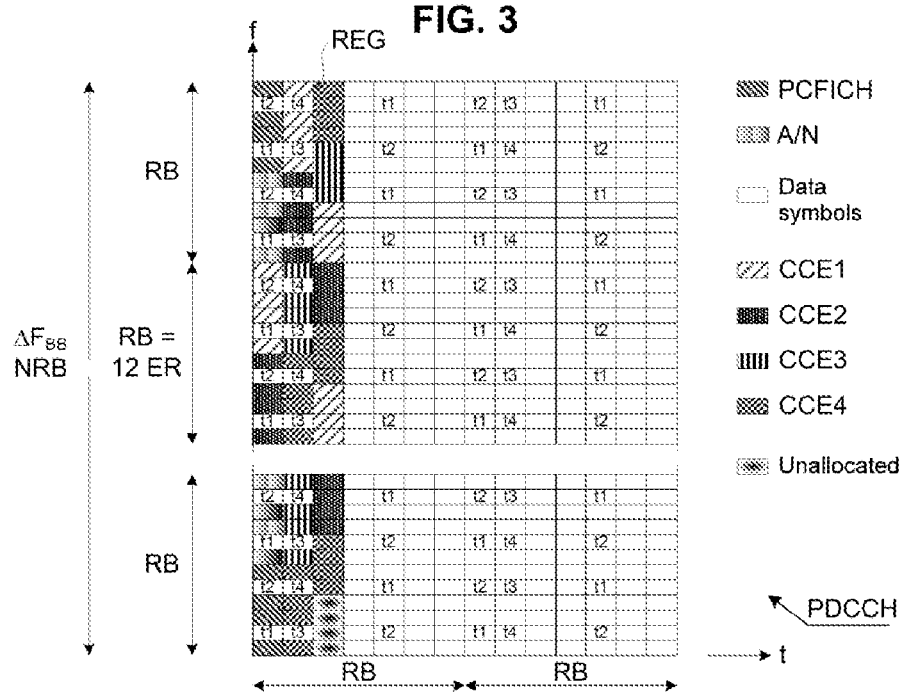
FIG. 3 is a time-frequency diagram of a zone of the LTE downlink frame which is common to reference signals and PCFICH and PDCCH channels.

For a MIMO configuration, the base station $BS_{BB}$ transmits, using transmit diversity, via a plurality of transmitting antenna ports, for example via four t1 to t4, to a plurality of antenna ports, using receive diversity, of the mobile $MB_{BB}$. For example, the base station transmits via 4 antenna ports to 2 antenna ports of the mobile. The resource elements of the reference signals RS1 to RS4, which are transmitted in frames via antenna ports t1 to t4 respectively, are distributed respectively to different positions in each resource block RB of the frame $TR_{DL}$, as shown in FIG. 3. The resource elements of the reference signals RS1, RS2 and RS3, RS4 are located respectively at 4 and 2 respective predetermined positions "t1", "t2" and "t3", "t4" in the blocks RB in the frame $TR_{DL}$. The frame transmitted by an antenna port comprises empty resource elements at positions which correspond to the reference signals associated with the other antenna ports.

The length of the sequence of a reference signal depends on the useful frequency bandwidth $\Delta F_{BB}$ of the network $R_{BB}$, expressed in terms of the number of blocks NRB, and the duration of the frame $TR_{DL}$, expressed in terms of the number of subframes. For example, for the first and second antenna ports t1 and t2, the sequence of the reference signal is spread over 6 RB×4 (ER per RB)×2 (slots)×10 (subframes)=480 resource elements "t1", "t2" for NRB=6 as shown in FIG. 3, or 100×4×2×10=8000 resource elements ER for NRB=100. The specific sequence of each reference signal is transmitted using quadrature phase-shift keying QPSK and is based on a pseudo-random Gold sequence of which each element depends on the numbers of the resource block in the frequency band $\Delta F_{BB}$ and of the slot in the frame in which the reference signal element is positioned, on the number of the symbol period in the slot, and on the identifier of the radio cell Cell-Id previously detected during the processing of the PSS and SSS signals. Owing to the reference signal RS, the mobile estimates the pulsed response of the transmission channel between the transmitting antenna port associated with the base station $BS_{BB}$ and the receiving antenna ports of the mobile $MB_{BB}$, which is capable of receive diversity reception.

The sequences of the reference signals acquired by means of pseudo-random generators are also used to demodulate signalling channels of the downlink frame, such as the PDCCH and PBCH channels and the shared downlink channel for traffic data (or "payload") PDSCH (physical downlink shared channel), and to carry out, in particular, power measurements for transmission to the base station for a power check. In particular, the mobile $MB_{BB}$ records the positions of all the resource blocks for which it has validated reference signal elements in such a way as to process, in particular, the signalling channels.

Figure 4:
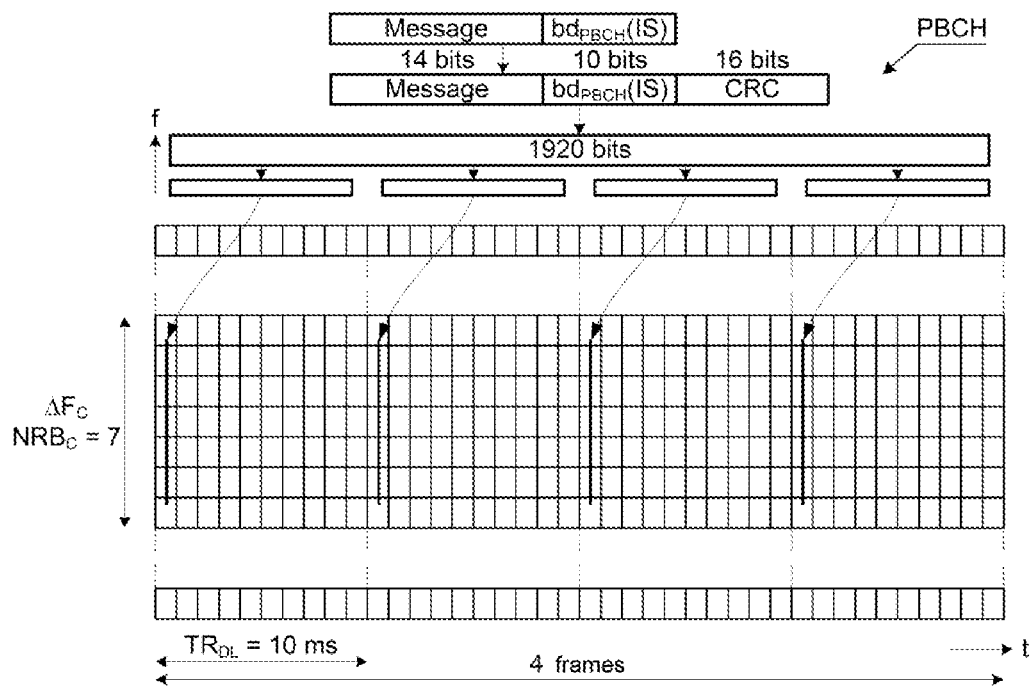
FIG. 4 is a time-frequency diagram of a PBCH channel on 4 LTE downlink frames.

The mobile $MB_{BB}$ then decodes and analyses the physical broadcast channel PBCH. As shown in FIG. 4, the PBCH channel transmitted by the base station $BS_{BB}$ comprises a message which is distributed in the first 4 symbol periods Ts of the blocks RB of the second slot following the synchronisation channels in the first subframe of the central band $\Delta F_C$ of each of 4 consecutive downlink frames. The message initially comprises 14 bits of information followed by 10 additional spare bits $bd_{PBCH}$ and is protected by the base station $BS_{BB}$ through being subjected thereby to an append of a 16-bit cyclic redundancy code CRC, a coding with a ⅓ rate convolutional code depending on the identifier Cell-Id, a transmission speed adaptation by repetitions and a spread over 4 consecutive downlink frames $TR_{DL}$. In total, 480×4=1920 bits undergo QPSK phase modulation into 960 radio elements of the central band which are reserved for the transport of the PBCH channel for a standard prefix length. From the 14 bits of the message which is decoded in the PBCH channel, the mobile $MB_{BB}$ acquires and stores:

the precise number NRB of resource blocks of the downlink frame $TR_{DL}$ in the frequency domain, for example NRB=6, 15, 25, 50, 75 or 100 for the LTE configuration with $\Delta F_{BB}$=1.4 MHz, 3 MHz, 5 MHz, 10 MHz, 15 MHz or 20 MHz, and, implicitly, the antenna port number of the base station;

information on the configuration of a physical hybrid ARQ indicator channel (PHICH) in order to access the organisation of a physical downlink control channel PDCCH defined below; and a system frame number (SFN) used as a time reference for the downlink frames and, indirectly, for the uplink frames for the radio cell, until the next update of the system information in the frames.

Even if some blocks are missing in the central band $\Delta F_C$, the relatively high level of protection associated with the PBCH channel is sufficient to correctly decode the preceding information which it contains. Indeed, the protection applied to the PBCH channel is based on 24 start data bits and 16 CRC code bits and on coding operations and repetitions. As a result, the information included in the PBCH channel is over-protected.

Once the reference signal has been acquired for each antenna port and the PBCH channel has been acquired, the mobile $MB_{BB}$ decodes a physical downlink control channel (PDCCH), doing so blind and on the basis of the resource blocks determined in the central band $\Delta F_C$ during decoding of the reference signal(s).

The PDCCH channel is used by the base station $BS_{BB}$ to communicate messages for allocating radio resources in terms of time and frequency in the frame for the uplinks and downlinks to the mobiles covered by the radio cell of the base station and thus to announce the delivery of information blocks relating to the configuration of the network $R_{BB}$, such as evolved-universal terrestrial radio access network (E-UTRAN) parameters and evolved packet core (EPC) parameters for interfaces between radio resource management (RRM) entity in the base station and a mobility management entity (MME) in an access point at the heart of the network $R_{BB}$.

Referring to FIG. 3, the PDCCH channel and an additional physical control format indicator channel (PCFICH) are multiplexed with reference signal resource elements in a common zone. The common zone extends over one to three first symbols of the first slot of each subframe of the downlink frame $TR_{DL}$ and over the entire band $\Delta F_{BB}$ of the network $R_{BB}$. The PCFICH channel comprises 4 REG groups of 4 resource elements RE, each in the first symbol period of the first slot of each subframe, and explicitly indicates the number of OFDMA symbols attributed to the PDCCH channel in the common zone of each subframe. Furthermore, the PHICH channels relating to acknowledgements or non-acknowledgements are also positioned in this common zone. The remainder of the symbols in the common zone are attributed to the PDCCH channel which is made up of a subzone common to the mobiles and of individual subzones for a limited number of mobiles and which is divided into small control channel element groups (CCE) each having 9 REG groups of 4 resource elements, that is 9×4=36 resource elements RE per CCE group. Each radio resource allocation message in the PDCCH channel comprises a respective number of bits which are protected according to a level of protection which is selected by the base station and defined by a 16-bit CRC protection password, a ⅓ rate convolutional code, repetitions and a QPSK modulation. The CCE groups can be aggregated into 1, 2, 4 or 8 CCE control groups, from a maximum of 16, and depend on the selected level of protection. Each mobile detects the precise position of the CCE groups which are reserved for the subzone common to the mobiles by means of a descrambling which depends on the common identifier and on the individual subzone occupied by the CCE group allocated to the mobile by means of a descrambling which depends on a temporary identifier of the mobile. According to the example, shown in FIG. 3, of a subframe of the downlink frame $TR_{DL}$, the common zone reserved for the PDCCH channel comprises 4 groups CCE1 to CCE4 each having 9 REG groups of 4 resource elements, and the PCFICH channel comprises 4 REG groups of 4 resource elements each, these channels being multiplexed with 4 reference signals RS1 to RS4 transmitted respectively by 4 antenna ports t1 to t4 of the base station.

Figure 5:
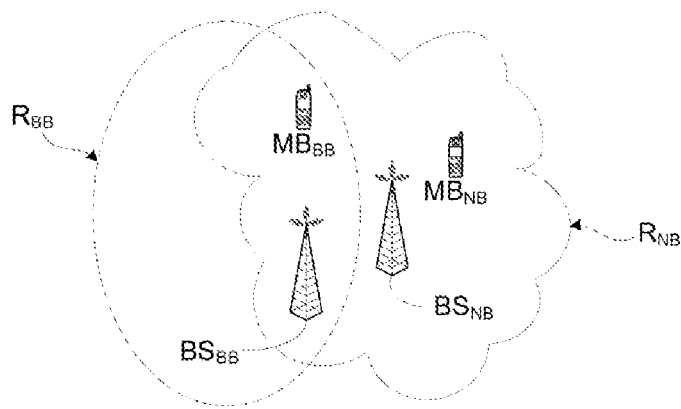
FIG. 5 is a diagram of a base station cell of a co-located narrowband radio-communications network according to the invention.

Referring to FIG. 5, the coverage of the cell (or sector) of the base station $BS_{BB}$ of the broadband network $R_{BB}$ is co-located in a geographical zone in which one or more base stations $BS_{NB}$ of a narrowband cellular radio-communications network $R_{NB}$ of the PMR type are active.

A base station $BS_{NB}$ transmits a group of carriers comprised in a narrow subband $BF_{NB}$ to mobiles $MB_{NB}$ of the network $R_{NB}$ and receives another group of carriers comprised in another narrow subband $BF_{NB}$ from the mobiles $MB_{NB}$. For example, the carriers have a width of 10 kHz. The receiving and transmitting carrier subbands $BF_{NB}$ of the narrowband network $R_{NB}$ are comprised in a predetermined useful frequency band $\Delta F_{NB}$, which is comprised in full or at least in part in the useful frequency band $\Delta F_{BB}$ of the broadband network $R_{BB}$. For example, a frequency subband of width $NSP_{RB} \times \delta f = 180$ kHz of the useful frequency band $\Delta F_{BB}$ corresponding to the width of a resource block RB of the broadband network $R_{BB}$ may include one or more carrier subbands $BF_{NB}$ of which the carriers interfere with one or more of the $NSP_{RB}$ subcarriers comprised in the resource block. Carrier subbands $BF_{NB}$ comprised in a resource block can be interleaved.

To overcome this drawback, the frequency band $\Delta F_{BB}$ of the broadband network $R_{BB}$ is shared with all or at least part of the band $\Delta F_{NB}$ of the narrowband network $R_{NB}$. As shown on the right of FIG. 7, at least one frequency subband, or more generally a plurality of frequency subbands, corresponding to a predetermined number $NRB_{NB}$ of predetermined radio resource blocks $RB_{NB}$ of the broadband network $R_{BB}$ are reserved for receiving and/or transmitting carrier subbands $BF_{NB}$ of the narrowband network $R_{NB}$, in which subbands base stations in the network $R_{NB}$ which neighbour the base station $BS_{BB}$ transmit and/or receive narrowband signals. The reserved subbands $RB_{NB}$ can be prepositioned anywhere in the band $\Delta F_{BB}$, for example for a weak part in the central band $\Delta F_C$ and for a greater part in the upper and lower bands $\Delta F_{UP}$ and $\Delta F_{LOW}$. The narrow subbands $RB_{NB}$ reserved for the base stations $BS_{NB}$ of the network $R_{NB}$ are imposed by the scheduling of the frequencies in the narrowband network and the location of the base stations $BS_{NB}$ with respect to the location of the base stations $BS_{BB}$. Such a division of the frequency band $\Delta F_{BB}$ protects the signals which are transmitted and/or received by the neighbouring base stations in the narrowband network $R_{NB}$ against interference from transmissions in the $NRB_{BB} = NRB - NRB_{NB}$ remaining frequency subbands $RB_{BB}$ by the base station $BS_{BB}$, and vice versa.

The base station $BS_{BB}$ does not transmit signals, including signalling channels, in the frequency subbands $RB_{NB}$ which are reserved for the narrowband network $R_{NB}$ and comprised in the central band $\Delta F_C$. However, the suppression of at least one subband $RB_{NB}$ in the central band $\Delta F_C$ could modify the features of the sequences of the synchronisation signals, of the reference signals and of the PBCH channel using LTE technology and, therefore, the functionalities in the base stations and the mobiles of the broadband network. Furthermore, a mobile $MB_{BB}$ of the broadband network should have pre-stored the distribution of the subbands $RB_{NB}$ of the narrowband network, and this is inapplicable since, on one hand, the frequential features of the narrowband network are a priori unknown to the mobile $MB_{BB}$ since the narrowband network may be temporarily present or, indeed, one or more other narrowband networks may be co-located with the broadband network, and, on the other hand, the mobile $MB_{BB}$ needs to be able to function normally with regard to the signalling of the LTE technology irrespective of the presence or otherwise of base stations $BS_{NB}$ of the narrowband network which are co-located with the base station $BS_{BB}$.

According to the invention, the features of the sequences of the synchronisation signals, of the reference signals and, more generally, of all the signalling channels, such as the PBCH channel, in the central band $\Delta F_C$ using LTE technology are maintained in the base station $BS_{BB}$, which continues to establish these signals and channels without switching and transmits these signals and channels only into the $NRB_{BB}$ frequency subbands $RB_{BB}$, despite the presence of one or more subbands $RB_{NB}$ in the central band $\Delta F_C$ which are reserved for the narrowband network $R_{NB}$.

A mobile $MB_{BB}$, according to the invention, which needs to communicate with the base station $BS_{BB}$ is a priori unaware of the position of each of the frequency subbands $RB_{NB}$ in the band $\Delta F_{BB}$ and is capable of synchronisation with any base station of the broadband network $R_{BB}$, whether or not said base station is co-located with base stations of the narrowband network $R_{NB}$. The invention offers solutions so that the mobile $MB_{BB}$ can acquire the positions of the subbands $RB_{BB}$ in the frequency band $\Delta F_{BB}$ of the broadband network and can use the acquired positions of the subbands $RB_{BB}$ to appropriately detect the LTE signalling which is necessary for determining at least one traffic resource block allocated to the mobile by the base station $BS_{BB}$. After the synchronisation phase, the mobile $MB_{BB}$ observes the frequency band $\Delta F_{BB}$ in each downlink frame $TR_{DL}$ as if said band had been "perforated" by "holes" having the width $NSP_{RB} \times \delta f$ of a radio resource block RB and respectively corresponding to the frequency subbands $RB_{NB}$ reserved for the narrowband network, and analyses only the $NRB_{BB}$ remaining frequency subbands $RB_{BB}$ of the "perforated" broadband $\Delta F_{BB}$ using LTE technology by replacing the initial number NRB of subbands (number of resource blocks in the frequency domain) with the number $NRB_{BB}$ of subbands which have not been disrupted by the narrowband network.

Figure 6:
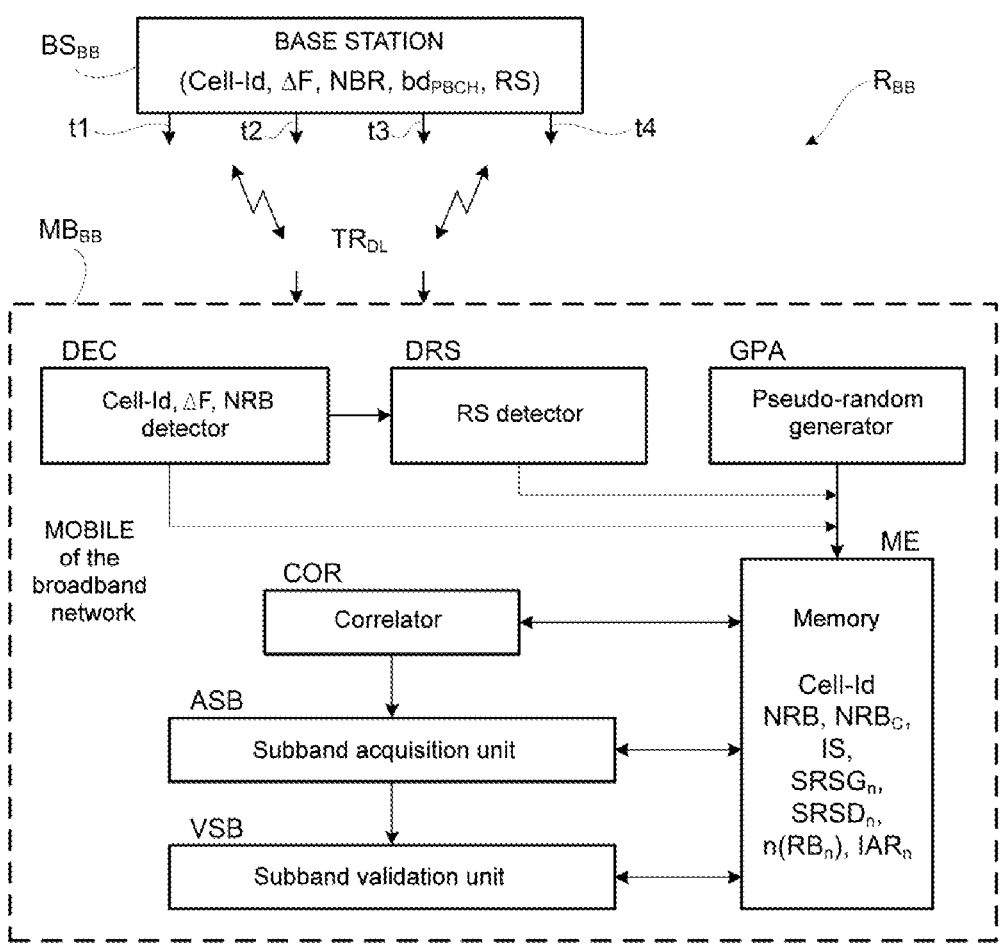
FIG. 6 is a schematic block diagram of a mobile receiving "perforated" downlink frames from a base station in a broadband radio-communications network according to the invention.

In the mobile $MB_{BB}$ shown in FIG. 6, only the functional blocks are shown which perform functions linked to the invention. Some of these functional blocks may correspond to computer program modules which are implemented in at least a processor and/or to programmable or dedicated material modules. In a synchronisation unit connected to a radio interface, the mobile $MB_{BB}$ comprises a bandwidth and cell identifier detector DEC included in a unit for processing PBCH channel and synchronisation signals, a pseudo-random generator GPA, a reference signal detector DRS, a correlator COR, a subband position acquisition unit ASB, a subband validation unit VSB and a memory ME.

Figure 8:
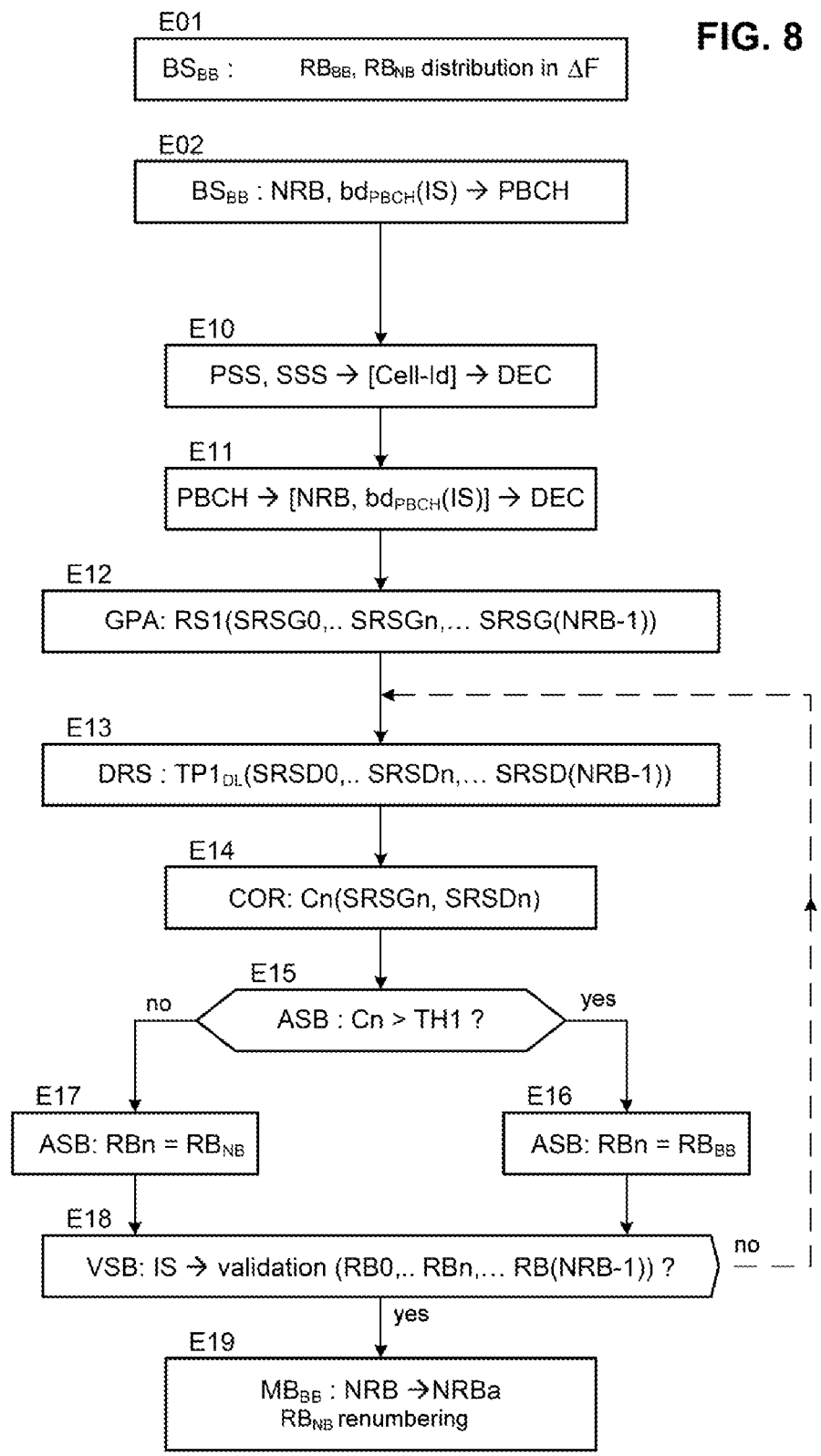
FIG. 8 shows an algorithm of the method for acquiring subbands in "perforated" downlink frames received by the mobile of the broadband radio-communications network, according to the first embodiment.

Referring now to FIG. 8, the subband acquisition method according to the first embodiment comprises steps E10 to E19, which are executed for "perforated" downlink frames $TP1_{DL}$ received in the mobile $MB_{BB}$ during a synchronisation phase. In this first embodiment, the base station $BS_{BB}$ operates using the above-described LTE technology, albeit with the few modifications set out below, established in initial steps E01 and E02 which precede steps E10 to E19.

In step E01, the base station $BS_{BB}$ pre-stores the features of the sharing of the frequency band $\Delta F_{BB}$ so that the radio interface of the base station does not transmit a signal in the subbands $RB_{NB}$ which are reserved for the narrowband network $R_{NB}$ and form "holes" in the useful band $\Delta F_{BB}$ but transmits "perforated" frames $TP1_{DL}$. According to an example, FIG. 7 shows a known LTE frame $TR_{DL}$ comprised in a band $\Delta F_{BB}$ of width NRB=15 resource blocks RB and having a central band $\Delta F_C$ of width $NRB_C$=7 resource blocks RB, compared with a "perforated" frame $TP1_{DL}$, according to the invention, which has a "hole" in the central band $\Delta F_C$, two distant "holes" in the upper band $\Delta F_{UP}$ and two contiguous "holes" in the lower band $\Delta F_{LOW}$, the holes corresponding to subbands $RB_{NB}$. By convention, the subbands are numbered 00 to NRB−1 in descending frequency order. According to FIG. 7, the base station $BS_{BB}$ only transmits the content of the subbands $RB_{BB}$ numbered 00, 02, 04, 05, 07, 08, 09, 10, 13 and 14 of the known LTE frame to the same positions in the "perforated" frame $TP1_{DL}$.

Without switching, the base station $BS_{BB}$ continues to establish the sequences of the PSS and SSS synchronisation signals and of the reference signals RS and the 14 useful bits of the message of the PBCH channel in the central band $\Delta F_C$. In particular the resource elements ER of reference signals RS1 to RS4 which are associated with antenna ports t1 to t4 of the base station $BS_{BB}$ are distributed in all the physical resource blocks and only those included in resource blocks corresponding to the subbands $RB_{NB}$ are not transmitted, so as to not disrupt the narrowband network $R_{NB}$.

In step E02, the base station introduces additional information IS into the 10 spare bits $bd_{PBCH}$ of the 24-bit message of the PBCH channel, which spare bits are used to validate, in particular, "holes" in the band $\Delta F_{BB}$ which are detected by the mobile $MB_{BB}$ and should correspond respectively to the subbands $RB_{NB}$ reserved for the narrowband network $R_{NB}$.

At the commencement of the synchronisation phase in step E10, the detector DEC in the mobile $MB_{BB}$ detects the identifier Cell-Id of the radio cell covered by the base station $BS_{BB}$ in the PSS and SSS synchronisation signals, the sequences of which are distributed in the remaining subbands $RB_{BB}$ of the central band $\Delta F_C$ in the downlink frame $TP1_{DL}$. The identifier Cell-Id is detected by using correlations both in the time domain on each slot of the frame $TP1_{DL}$ and in the frequency domain on all the blocks and, thus, on all the subbands of the central band $\Delta F_C$ since the mobile is unaware of the positions of the subbands $RB_{NB}$ which are reserved for the narrowband network $R_{NB}$. The identifier Cell-Id is stored in memory ME of the mobile.

Then, in step E11, the detector DEC decodes the physical broadcast channel PBCH which is transmitted periodically in the central subbands of 4 consecutive downlink frames $TP1_{DL}$ used by the base station $BS_{BB}$. The physical broadcast channel PBCH is decoded on the basis of the cell identifier Cell-Id detected in the PSS and SSS synchronisation signals. From the 24-bit decoded message in the PBCH channel, the mobile $MB_{BB}$ extracts the number NRB of subbands of a downlink frame $TR_{DL}$ of which said mobile deduces the width of the frequency band $\Delta F_{BB}$ used by the base station $BS_{BB}$ and the number $NRB_C$ of subbands supporting the common signalling channels in the central band $\Delta F_C$. The mobile $MB_{BB}$ also extracts the additional information IS in the spare bits $bd_{PBCH}$ of the decoded message. The parameters NRB, $NRB_C$ and IS are stored in the memory ME of the mobile.

The resource elements ER of the reference signals RS1 to RS4 which are associated with the antenna ports t1 to t4 of the base station $BS_{BB}$ are distributed in all the resource blocks of the NRB subbands, and only the resource elements of the reference signals which are included in the subbands $RB_{BB}$ reserved for the broadband network $R_{BB}$ are actually transmitted in the frames $TP1_{DL}$ by the base station $BS_{BB}$. The search of the subbands $RB_{BB}$ is identical with respect to any of the reference signals RS1 to RS4. The following steps are based on, for example, the reference signal RS1 of the obligatory first antenna port t1.

In step E12, following the detection of the PSS and SSS synchronisation signals and of the PBCH channel, the pseudo-random generator GPA in the mobile $MB_{BB}$ generates the elements of the specific sequence of the reference signal RS1 on the basis of the positions of these elements in an LTC frame defined by the identifier Cell-Id and the numbers NRB and $NBR_C$ stored in steps E10 and E11. The generated sequence of the signal RS1 is divided into NRB reference subsequences SRSGn, with 0≤n≤NRB−1, as per the aforesaid subband numbering convention. The reference subsequences SRSGn are recorded together with the n index in the memory ME. The subsequence SRSGn is made up of the ordered elements of the generated sequence of the reference signal RS1 which should be included in the 20 resource blocks RB of the subband RBn of an LTE frame $TR_{DL}$ for the useful frequency band $\Delta F_{BB}$ defined by the block number NRB.

Then, in step E13, the detector DRS detects and samples the resource elements ER located at the positions of the elements of the reference signal RS1 in all the subbands of the frequency band $\Delta F_{BB}$ for the period of the downlink frame $TP1_{DL}$ received by the mobile $MB_{BB}$. The detected elements of the signal RS1 contained in each subband RBn of the frame $TP1_{DL}$, with 1≤n≤NRB, are grouped successively into a detected reference subsequence SRSDn which is recorded in the memory ME.

In step E14, the correlator COR determines a correlation coefficient Cn for each pair of detected and generated reference subsequences SRSGn and SRSDn. The subband position acquisition unit ASB compares each of the correlation coefficients C0 to C(NRB−1) against a predetermined threshold TH1 in step E15. If the correlation coefficient Cn exceeds the threshold TH1, the ASB unit accepts the subband RBn as one of the subbands $RB_{BB}$ in which the base station $BS_{BB}$ transmits and stations $BS_{NB}$ of the narrowband network $R_{NB}$ do not transmit, and writes in the memory ME the number n corresponding to the position of the accepted subband RBn in the band $\Delta F_{BB}$, in step E16. If Cn≤TH1, the ASB unit rejects the subband RBn as one of the subbands $RB_{NB}$ which are reserved for the narrowband network $R_{NB}$ and in which the base station $BS_{BB}$ does not transmit, and writes in the memory ME the number n corresponding to the position of the rejected subband RBn of the band $\Delta F_{BB}$, in step E17. In fact, the signal transmitted in a subband $RB_{NB}$ by the base stations $BS_{NB}$ of the narrowband network has, a priori, a different periodicity from the frames $TP1_{DL}$ and from the relatively unstable elements located at the positions corresponding to elements of the reference signal which are, a priori, different. The ASB unit records the number "n" of the position of each accepted or rejected subband RBn together with an acceptance/rejection indicating bit IARn in the memory ME, in which said unit gradually accumulates the acceptances and rejections of the subbands in a number NRBa of accepted subbands and a number NRBr of rejected subbands for the received frame $TP1_{DL}$.

However, in the event of disruption to the propagation channel of the reference signal RS1 for the subband RBn, for example owing to interference signals and/or multiple backscatter and/or a partial masking of the cell of the base station $BS_{BB}$, the correlation coefficient Cn for at least one subband RBn may erroneously be below the threshold TH1. The additional information IS in the 10 spare bits $bd_{PBCH}$ of the message of the PBCH channel are intended to complete the decisions of the ASB unit in such a way as to definitively validate the position and number NRBa of the accepted subbands $RB_{BB}$ and the position and number NRBr of the rejected subbands $RB_{NB}$, in step E18. For the purpose of this validation, the subband validation unit VSB in the mobile may be adapted to one or more of the four variants according to the additional information IS, depending on the width of the useful frequency band $\Delta F_{BB}$ used by the base station $BS_{BB}$ and, thus, on the number of blocks NRB, and depending on comparisons of indicators included in the additional information IS and on the numbers NRBa and NRBr of subbands which have been accepted and rejected by the ASB unit.

The first variant relates to a block number NRB which is equal to 6. The additional information IS comprises the 6 high-order bits of the 10 spare bits $bd_{PBCH}$ of which the rows correspond to the numbers 1 to 6 of the subbands in the band $\Delta F_{BB}$. A first state "1" of an additional information bit indicates that the respective subband $RB_{BB}$ is occupied by symbols transmitted by the base station $BS_{BB}$. A second state "0" of an additional information bit indicates that the respective subband $RB_{NB}$ is reserved for the narrowband network $R_{NB}$. In this first variant, steps E12 to E17 are not executed and the validation unit VSB records the additional information bits, as acceptance/rejection indicating bits IARn, together in each case with their rows, as position numbers "n" of the subbands RBn in the memory ME.

The second variant relates to block number NRB values which are at least equal to 15 for the LTE configuration with $\Delta F_{BB}$=3 MHz. The additional information IS comprises the 7 high-order bits of the 10 spare bits $bd_{PBCH}$ for indicating the number $NRB_{BB}$ of subbands which are actually used in the band $\Delta F_{BB}$ by the base station $BS_{BB}$. The number $NRB_{BB}$ may be at most equal to 100<$2^7$−1 for the LTE configuration with $\Delta F_{BB}$=20 MHz. In this second variant, the validation unit VSB compares the numbers $NRB_{BB}$ and NRBa and, if they are equal, validates the positions of the accepted and rejected subbands. Where this is not the case, steps E12 to E18 are repeated for at least one other reference signal RS2 to RS4, for example the signal RS2, when the base station $BS_{BB}$ diversity-transmits via a plurality of antenna ports. If the numbers $NRB_{BB}$ and NRBa are not equal for one of the reference signals RS1 to RS4, steps E13 to E18 are repeated for the next frame $TP1_{DL}$. If, after a predetermined number of successively analysed frames, the identity $NRB_{BB}$=NRBa is not validated, the mobile $MB_{BB}$ tries to connect to another base station of the network $R_{BB}$.

The third variant also relates to the NRB values which are at least equal to 15. The additional information IS comprises the 10 spare bits $bd_{PBCH}$ in the message of the PBCH channel. The 10 bits $bd_{PBCH}$ are divided into first and second 5-bit indicators, which indicate numbers of subbands $RB_{NB}$ included in two complementary parts of the useful band $\Delta F_{BB}$. According to the example shown in FIG. 7, the first indicator indicates the number $NRB_{NB,sup}$ of subbands $RB_{NB}$ comprised in the upper "half" $\Delta F_{sup}$ of the useful band $\Delta F_{BB}$, including the subband which includes the central frequency $f_{DC}$ when the number NRB of subbands in the frequency band $\Delta F_{BB}$ is odd (FIG. 7), and is compared by the VSB unit against the number of rejected subbands $NRBr_{sup}$ included in the upper "half" of the band $\Delta F_{BB}$. The second indicator indicates the number $NRB_{NB,inf}$ of subbands $RB_{NB}$ comprised in the lower "half" $\Delta F_{inf}$ of the useful band $\Delta F_{BB}$, which number is not comprised in the subband which includes the central frequency $f_{DC}$ when the number NRB is odd (FIG. 7), and is compared by the VSB unit against the number of rejected subbands $NRBr_{inf}$ included in the lower "half" of the band $\Delta F_{BB}$. Although the indicators are at most equal to $2^5$−1=31 and are thus lower than half NRB/2 the number of resource blocks in the band $\Delta F_{BB}$ for the LTE configuration with $\Delta F_{BB}$ equal to 15 MHz or 20 MHz, the maximum number of rejected subbands for occupation by the narrowband network $R_{NB}$ of approximately ⅔ of the number of subbands in the band $\Delta F_{BB}$ is not reached in practice. In this third variant, the VSB unit validates the positions of the accepted and rejected subbands if the numbers $NRB_{NB,sup}$ and $NRBr_{sup}$ are equal and the numbers $NRB_{NB,inf}$ and $NRBr_{inf}$ are equal. Where this is not the case, steps E13 to E18 are repeated for at least one other reference signal RS2 to RS4, for example the signal RS2, and then for a predetermined number of the subsequent frames, as for the second variant, until the VSB unit validates identities $NRB_{NB,sup}$=$NRBr_{sup}$ and $NRB_{NB,inf}$=$NRBr_{inf}$. If this does not happen, the mobile $MB_{BB}$ tries to connect to another base station of the network $R_{BB}$.

The fourth variant again relates to the NRB values which are at least equal to 15. The additional information IS is based on the 10 bits $bd_{PBCH}$ which are divided into three indicators. The first indicator has 2 bits and indicates the number $NRB_{NB,C}$ of subbands $RB_{NB}$ in the blocks of the central band $\Delta F_C$ which are occupied by the narrowband network $R_{NB}$. The second indicator has 4 bits and indicates the number $NRB_{NB,}$ $_{UP}$ of subbands $RB_{NB}$ in the upper band $\Delta F_{UP}$. The third indicator has 4 bits and indicates the number $NRB_{NB,LOW}$ of subbands $RB_{NB}$ in the lower band $\Delta F_{LOW}$. Although the second and third indicators $NRB_{NB,UP}$ and $NRB_{NB,LOW}$ are at least equal to $2^4-1=15$ and, thus, lower than (NRB−6)/2 or (NRB−8)/2 for the LTE configuration with $\Delta F_{BB}$ equal to 10 MHz, 15 MHz or 20 MHz, a maximum of 30+3=33 rejected subbands in the band $\Delta F_{BB}$ is considered to be sufficient in practice for occupation by the narrowband network $R_{NB}$. In this fourth variant, the VSB unit includes the rejected subbands in the bands $\Delta F_C$, $\Delta F_{UP}$ and $\Delta F_{LOW}$, and compares the obtained numbers $NRBr_{NB,C}$, $NRBr_{NB,UP}$ and $NRBr_{NB,LOW}$ with the numbers $NRB_{NB,C}$, $NRB_{NB,UP}$ and $NRB_{NB,LOW}$ respectively. The VSB unit validates the positions of the accepted and rejected subbands if the numbers $NRBr_{NB,C}$ and $NRB_{NB,C}$ are equal, the numbers $NRBr_{NB,UP}$ and $NRB_{NB,UP}$ are equal and the numbers $NRB_{NB,inf}$ and $NRBr_{inf}$ are equal. Where this is not the case, steps E13 to E18 are repeated for at least one other reference signal RS2 to RS4, for example the signal RS2, and then for a predetermined number of the succeeding frames, as for the second or third variant.

For all these variants, the mobile of the invention also operates with a broadband base station according to the prior art, or when there is no transmitting narrowband base station.

After validation step E18, the mobile $MB_{BB}$ according to the invention has acquired the position of the "holes" corresponding to the $NRB_{NB}$ subbands of the narrowband network in the band $\Delta F_{BB}$, replaces the number NRB of initial subbands in the band $\Delta F_{BB}$ with the number $NRBa=NRB_{BB}$ of validated accepted subbands $RB_{BB}$ and renumbers them from 1 to NRBa, in step E19. The renumbering is then in line with the numbers of the subbands $RB_{NB}$ which are used in the base station $BS_{NB}$ for allocating resource blocks in the subbands $RB_{NB}$. This allows the mobile to acquire the radio resources of the other signalling channels, in particular the PDCCH channel for radio resource allocation, which are distributed only in the validated accepted subbands $RB_{BB}$ of the central band $\Delta F_C$ of the downlink frames $TP1_{DL}$ transmitted by the base station $BS_{BB}$. The radio resources of the acquired signalling channels are then processed in the mobile using LTE technology.

Figure 10A:
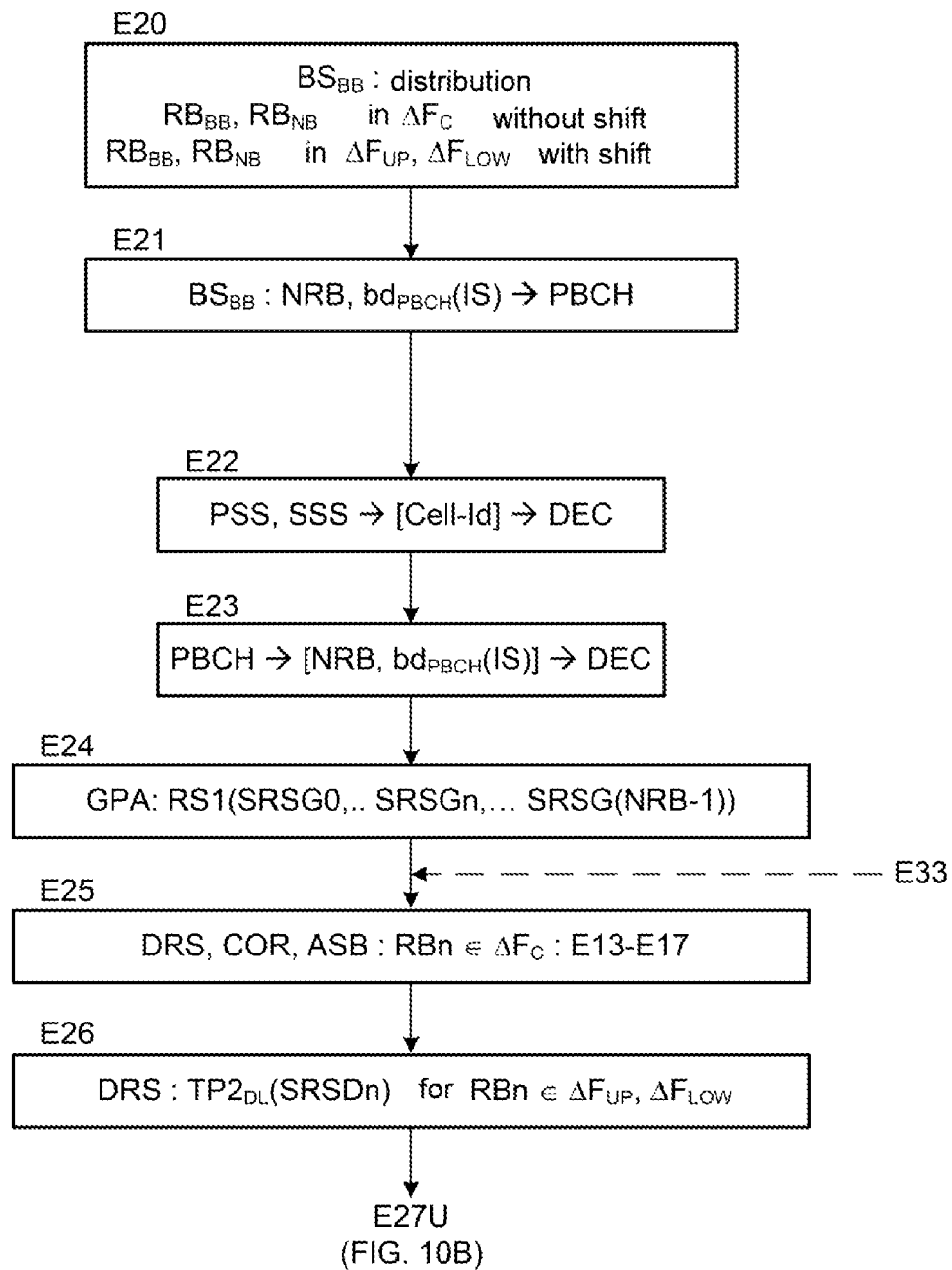
FIGS. 10A and 10B show algorithms of the method for acquiring subbands in "perforated" downlink frames received by the mobile of the broadband radio-communications network, according to the second embodiment.
Figure 10B:
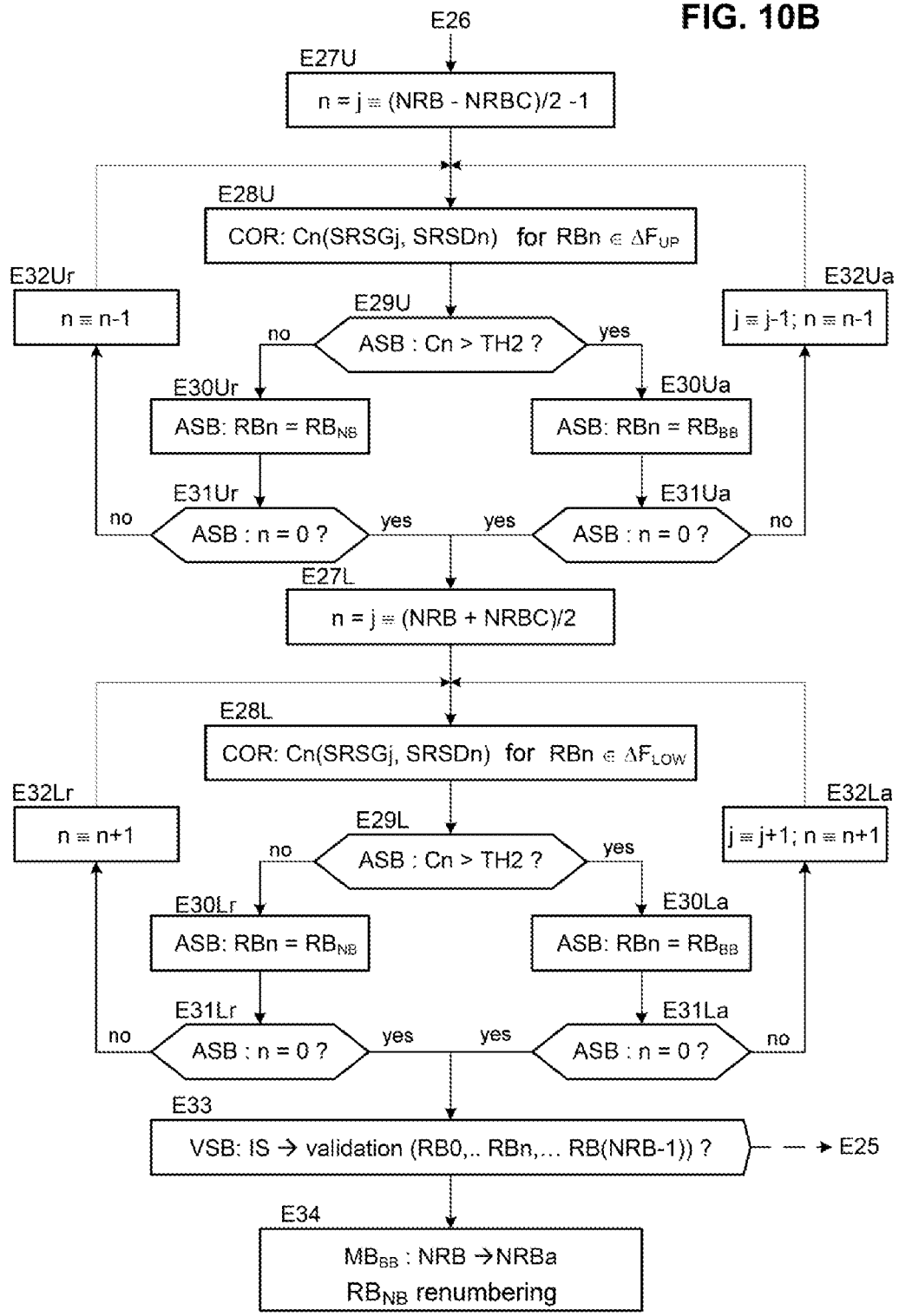

According to the second embodiment of the invention, the radio resource acquisition method comprises steps E22 to E34 shown in FIGS. 10A and 10B, which are executed for downlink frames $TP2_{DL}$ received in the mobile $MB_{BB}$ during a synchronisation phase. In this second embodiment, the base station $BS_{BB}$ operates using the above-described LTE technology, albeit with the following modifications established at initial steps E20 and E21 which precede steps E22 to E34.

In step E20, the base station $BS_{BB}$ pre-stores the features of the sharing of the frequency band $\Delta F_{BB}$ so that the radio interface of the base station does not transmit a signal in the subbands $RB_{NB}$ which are reserved for the narrowband network $R_{NB}$ and included in the useful band $\Delta F_{BB}$ but transmits "perforated" frames $TP2_{DL}$. Without switching, the base station $BS_{BB}$ continues to establish the sequences of the PSS and SSS synchronisation signals and of the reference signals RS and the 14 useful bits of the message of the PBCH channel in the central band $\Delta F_C$, after having extracted the content from the subbands $RB_{NB}$ to form "holes". This ensures correct use of the reference signal elements included in the central band $\Delta F_C$ for demodulating the PBCH channel. In the same way, "holes" corresponding to subbands $RB_{NB}$ are formed in the upper band $\Delta F_{UP}$ and the lower band $\Delta F_{LOW}$.

By contrast, compared with the first embodiment, the reference signal subsequences initially contained in the subbands $RB_{BB}$ of the upper band $\Delta F_{UP}$ of the known LTE frame $TR_{DL}$ are transferred successively into the remaining subbands $RB_{BB}$ of the upper band $\Delta F_{UP}$ of the "perforated" frame $TP2_{DL}$ to be transmitted by the base station $BS_{BB}$, starting with the lower subband of the band $\Delta F_{UP}$ in ascending frequency order. Similarly, the reference signal subsequences initially contained in the subbands $RB_{BB}$ in the lower band $\Delta F_{LOW}$ of the known LTE frame $TR_{DL}$ are transferred successively into the remaining subbands $RB_{BB}$ of the lower band $\Delta F_{LOW}$ of the "perforated" frame $TP2_{DL}$ to be transmitted by the base station $BS_{BB}$, starting with the upper subband of the band $\Delta F_{LOW}$ in descending frequency order.

On the basis of an example of an LTE frame $TR_{DL}$ shown on the left of FIG. 9, which frame is comprised in a band $\Delta F_{BB}$ of width NRB=15 resource blocks RB and has a central band $\Delta F_C$ of width NRB=7 resource blocks RB, FIG. 9 shows, on the right, a "perforated" frame $TP2_{DL}$ according to the invention having:

a central band $\Delta F_C$ comprising a "hole" $RB_{NB}$ located at position 06, and subbands $RB_{BB}$ which are located at positions 04, 05 and 07, 08, 09 and 10 and support the PSS and SSS synchronisation signals, reference signals RS and the message of the PBCH channel as in the frame $TR_{DL}$;

an upper band $\Delta F_{UP}$ comprising two distant "holes" $RB_{NB}$, which are located at positions 03 and 01 of the frame $TR_{DL}$, and subbands $RB_{BB}$ which are located at positions 02 and 00 of the frame $TR_{DL}$ and contain the reference signal RS resource elements contained in the subbands $RB_{BB}$ located at the successive positions 03 and 02; and a lower band $\Delta F_{LOW}$ comprising two contiguous "holes" $RB_{NB}$, which are located at positions 11 and 12 of the frame $TR_{DL}$, and subbands $RB_{BB}$ which are located at positions 13 and 14 of the frame $TR_{DL}$ and contain the reference signal RS resource elements contained in the subbands $RB_{BB}$ located at the successive positions 11 and 12.

In step E21, which is similar to step E02, the base station introduces additional information IS into the 10 spare bits $bd_{PBCH}$ of the 24-bit message of the PBCH channel.

At the commencement of the synchronisation phase of the mobile $MB_{BB}$, steps E22 and E23 are similar to steps E10 and E11 according to the first embodiment. The detector DEC in the mobile $MB_{BB}$ detects the identifier Cell-Id of the radio cell covered by the base station $BS_{BB}$ in the PSS and SSS synchronisation signals and extracts the number NRB of subbands in a downlink frame $TR_{DL}$ from the 24-bit decoded message in the PBCH channel. From the extracted message, the detector DEC deduces the width of the frequency band $\Delta F_{BB}$ used by the base station $BS_{BB}$ and the number $NRB_C$ of subbands supporting common signalling channels in the central band $\Delta F_C$. The detector DEC also extracts the additional information IS in the spare bits $bd_{PBCH}$ of the decoded message.

As in the first embodiment, since the search of the subbands $RB_{BB}$ is identical with respect to any of the reference signals RS1 to RS4, the next steps E24 to E28 can be based on the reference signal RS1 of the obligatory first antenna port t1.

In step E24, which is similar to step E12 according to the first embodiment, the elements of the specific sequence of the reference signal RS1 are generated by the pseudo-random generator GPA in the mobile $MB_{BB}$ according to the identifier Cell-Id and to the numbers NRB and $NBR_C$ defining the frequency band $\Delta F_{BB}$ and are recorded in the memory ME in step E23. The elements of the sequence of the reference signal RS1 which are anticipated in the central band $\Delta F_C$ are grouped into $NRB_C$ reference subsequences SRSGn in the memory ME, with $(NRB-NRB_C)/2 \leq n \leq (NRB+NRB_C)/2-1$, as per the aforesaid subband numbering convention. The elements of the sequence of the reference signal RS1 which are anticipated in the upper $\Delta F_{UP}$ and lower $\Delta F_{LOW}$ bands are grouped into $NRB-NRB_C$ reference subsequences SRSGn in the memory ME, with $0 \leq n \leq (NRB-NRB_C)/2-1$ and $(NRB+NRB_C)/2 \leq n \leq NRB-1$.

In step E25, since the positioning of the $NRB_C$ subbands in the central band $\Delta F_C$ of the frame $TP1_{DL}$ is unaffected by any frequential shift, as for the subbands according to the first embodiment, the detector DRS, correlator COR and acquisition unit ASB apply steps E13 to E17 to the central band $\Delta F_C$, in order to detect the resource elements ER located at the positions of the elements of the reference signal RS1 in all the subbands of the central band $\Delta F_C$ for the period of the downlink frame $TP2_{DL}$ received by the mobile $MB_{BB}$, to determine correlation coefficients Cn for each pair of detected and generated reference subsequences SRSGn and SRSDn which is associated with the subbands of the central band $\Delta F_C$, to compare these correlation coefficients Cn against the threshold TH1, and to deduce therefrom the accepted subband positions and the rejected subband positions in the central band $\Delta F_C$ to be written in the memory ME.

Where appropriate, step E25 is supplemented with step E18 to validate the positions of the accepted and rejected subbands on the basis of additional information IS extracted from the 10 spare bits $bd_{PBCH}$ of the PDCH channel in step E23. For example, the base station introduces additional information IS into the 10 spare bits $bd_{PBCH}$ of the 24-bit message of the PBCH channel which are used to validate, in particular, "holes" in the central band $\Delta F_C$ which are detected by the mobile $MB_{BB}$ and should respectively correspond to the subbands $RB_{NB}$ of the narrowband network. Since the number of possible holes in the central band $\Delta F_C$ is at least equal to the whole $NRB_C/2$ part, that is 3 according to FIG. 9, and is thus small, the first variant according to the first embodiment can be used to accurately indicate the positions of the subbands in the central band $\Delta F_C$ and their assignments to subbands $RB_{NB}$ and $RB_{BB}$ via the rows and the states of the $NRB_C$ high-order bits of the 10 spare bits $bd_{PBCH}$. According to the example in FIG. 9, the 7 high-order bits $bd_{PBCH}$ are "1101111" and the bit "0" corresponds to the subband $RB_{NB}$ at position 06.

Then, in step E26, which is concomitant with step E24, the detector DRS detects and samples the resource elements ER located at the positions of the elements of the signal RS1 in the upper $\Delta F_{UP}$ and lower $\Delta F_{LOW}$ bands of the downlink frame $TP2_{DL}$ received by the mobile $MB_{BB}$. The detected elements of the signal RS1 contained in each subband RBn of the frame $TP2_{DL}$, with $0 \leq n \leq (NRB-NRB_C)/2-1$ and $(NRB+NRB_C)/2 \leq n \leq NRB-1$, are grouped successively into detected reference subsequences SRSDn which are stored in the memory ME.

The following steps E27U to E32U recur so that the mobile successively analyses the reference subsequences SRSDj included respectively in the subbands RBn of the upper band $\Delta F_{UP}$ which are transmitted in the frame $TP2_{DL}$ by the base station $BS_{BB}$, with $0 \leq n \leq (NRB-NRB_C)/2-1$ and $j \geq n$. The recurrence begins with the lower subband RBn of the band $\Delta F_{UP}$ with the index $n=j=(NRB-NRB_C)/2-1$ in step E27U. In step E28U, the correlator COR determines a correlation coefficient Cn for the pair of detected and generated reference subsequences SRSGj and SRSDn with $n=j=(NRB-NRB_C)/2-1$. The subband position acquisition unit ASB compares the correlation coefficient Cn against a predetermined threshold TH2 in step E29U. If the correlation coefficient Cn exceeds the threshold TH2, the ASB unit accepts the subband RBn as one of the subbands $RB_{BB}$ in which the base station $BS_{BB}$ transmits and stations $BS_{NB}$ of the narrowband network $R_{NB}$ do not transmit, and writes in the memory ME the number n corresponding to the position of the accepted subband RBn in the band $\Delta F_{UP}$, in step E30Ua. The ASB unit then decrements the indices j and n into j−1 and n−1 in step E32Ua if the n index is not zero in step E31Ua. If $Cn \leq TH2$ in step E29U, the ASB unit rejects the subband RBn as one of the subbands $RB_{NB}$ which are reserved for the narrowband $R_{NB}$ and in which the base station $BS_{BB}$ does not transmit, and writes in the memory ME the number n corresponding to the position in the rejected subband RBn of the band $\Delta F_{UP}$, in step E30Ur. The ASB unit then decrements only the n index into n−1 in step E32Ur if the n index is not zero in step E31Ur. After steps E32Ua and E32Ur, the method returns to step E28U.

The value of the j index is maintained in step E32Ur so that, in the next step E28U, the correlator COR determines a correlation coefficient C(n−1) between the generated reference subsequence SRSGj which has not been found by the ASB unit in the previously scanned subband RBn and the detected reference subsequence SRSD(n−1) in the next subband RB(n−1) to be scanned. Until the generated reference subsequence SRSGj is found in subsequent subbands $RB_{NB}$ which are attributed to the narrowband network and correspond to holes in the received frame $TP1_{DL}$, the j index is maintained and the mobile searches the next subband $RB_{BB}$ transmitted by the base station $BS_{BB}$ of the broadband network.

By contrast, the value of the j index is decremented in step E32Ua so that, in the next step E28U, the correlator COR determines a correlation coefficient C(n−1) between the next generated reference subsequence SRSG(j−1) which is to be found by the ASB unit in the next subband RB(n−1) to be scanned, and, where appropriate, in other subsequent successive subbands, and the detected reference subsequence SRSD (n−1) in the next subband RB(n−1) to be scanned.

When the n index is zero in one of the steps E31Ua and E31Ur, scanning of the upper band $\Delta F_{UP}$ in the frame $TP2_{DL}$ received by the mobile $MB_{BB}$ is stopped. The method proceeds to the scanning of the lower frame $\Delta F_{LOW}$ of the received frame $TP2_{DL}$ according to steps E27L to E31La-E31Lr, which are similar to the preceding steps E27U to E31Ua-E31Ur. The recurrence begins with the upper subband RBn of the band $\Delta F_{LOW}$ with the index $n=j=(NRB+NRB_C)/2$, in step E27L. The next steps E28L to E32La-E32Lr recur so that the mobile successively analyses the detected reference subsequences SRSDn respectively included in the subbands RBn of the lower band $\Delta F_{LOW}$. The n index is incremented in steps E32La and E32Lr, and the j index is incremented only in step E32La from the starting values in step E27L.

In a variant, the upper and lower bands $\Delta F_{UP}$ and $\Delta F_{LOW}$ are scanned at the same time.

In the second embodiment of the method, the subbands $RB_{BB}$ transmitted by the base station $BS_{BB}$ are advantageously acquired in a faster and more reliable manner.

As according to the variants of the first embodiment, additional information IS in the 10 spare bits $bd_{PBCH}$ of the message of the PBCH channel can possibly be acquired by the mobile for definitively validating, by means of the VSB unit, the position and number NRBa of the accepted subbands $RB_{BB}$ and the position and number NRBr of the rejected subbands $RB_{NB}$, in step E33, which is similar to step E18.

After scanning the upper and lower bands $\Delta F_{UP}$ and $\Delta F_{LOW}$, the mobile $MB_{BB}$ which acquired the positions of the subbands $RB_{NB}$ of the narrowband network in the band $\Delta F_{BB}$ and the positions of the subbands $RB_{BB}$ transmitted by the base station $BS_{BB}$ in the band $\Delta F_{BB}$ updates the number NRB of initial subbands in the band $\Delta F_{BB}$ with the sum of the numbers NRBa of accepted subbands $RB_{BB}$ in the bands $\Delta F_C$, $\Delta F_{UP}$ and $\Delta F_{LOW}$ and renumbers them, in step E34, as in step E19.

According to variants of the preceding embodiments, the base station $BS_{BB}$ is sectioned into, for example, 3 sectors and transmits in the central band $\Delta F_C$ for each sector, which sector is considered to be a cell of the network $R_{BB}$, a set of signals and channels comprising, in particular, PSS and SSS synchronisation signals, one or more reference signals RS and a physical broadcast channel PBCH. A mobile according to the invention is able to acquire the distribution of the subbands $RB_{BB}$ and $RB_{NB}$ which is specific to each sector according the method of the invention.

In the mobiles according to the invention connecting to the base station $BS_{BB}$, the distribution of the subbands $RB_{BB}$ which is acquired in the band $\Delta F_{BB}$_$\Delta F_{DOWNLink}$ of the downlink frames transmitted by the base station $BS_{BB}$ is transferred similarly into the band $\Delta F_{UPLink}$ of the uplink frames to be received by the base station $BS_{BB}$. In fact, the broadband network $R_{BB}$ operates in frequency-division duplex FDD mode, according to which the $\Delta F_{DOWNLink}$ and $\Delta F_{DOWNLink}$ frames are separated by a frequency duplex interval and organised in the same manner. For example, a mobile $MS_{BB}$ receives from the base station $BS_{BB}$ the list of allocated resource blocks in which the mobile $MS_{BB}$ is authorised to transmit to the base station. If some allocated resource blocks are included in subbands $RB_{NB}$ of the narrowband network, the mobile $MS_{BB}$ does not transmit any information in the forbidden subbands of the uplink frames and distributes the data that it is required to transmit only in the accepted subbands $RB_{BB}$ of the uplink frames.

Although the invention has been described in the context of a broadband network using LTE technology, the invention also applies to a broadband cellular radio-communications network using, for example, worldwide interoperability for microwave access (WiMAX) technology having a band $\Delta F_{BB}$ with a width of several tens of MHz. For example, the band $\Delta F_{BB}$ is from 20 MHz on $NSP_{BB}$=2048 subcarriers and the frames are of the OFDMA-access type. A resource block $RB_{QL}$ allocated to data of a mobile terminal and (pilot) reference symbols comprises 2 clusters which each have 4 reference symbols and extend over 14 contiguous subcarriers of width $\delta f$=10.94 kHz which are selected in the band $\Delta F_{BB}$, that is $NSP_{RB}$=28, and over a time slot which is common to 2 symbol periods, each of Ts=102.9 µs. The frame comprises 20 time slots and has a duration of 10 ms.

The described invention relates to a method and to a mobile for acquiring subbands in a frame by the mobile. According to an embodiment, steps of the method of the invention are determined by the instructions of a computer program incorporated in the mobile. The program which is able to be implemented in the mobile of the invention comprises program instructions which, when said program is executed in the mobile of which the operation is now controlled by the execution of the program, carry out steps of the method according to the invention.

Consequently, the invention also applies to a computer program, in particular a computer program recorded on or in a recording medium which can be read by a computer and any data-processing device capable of implementing the invention. This program can use any programming language and be in the form of source code or object code, or of intermediary code between source code and object code as in a partially compiled code, or in any other form which is desirable for implementing the method according to the invention. The program can be downloaded in the base station via a communication network, such as the Internet.

The recording medium may be any entity or device which is capable of storing the program. For example, the medium may have a storage means on which the computer program according to the invention is recorded, such as a ROM, for example a CD ROM or a microelectronic circuit ROM, or a USB stick, or a magnetic recording means, such as a floppy disk or hard disk, a microfilm or perforated cards.

The invention claimed is:

1. A method in a mobile device ($MB_{BB}$) for acquiring first subbands ($RB_{BB}$) in at least a broadband portion of a broad frequency band, the method comprising:
    dividing a reference signal (RS1) generated in the mobile device into generated subsequences (SRSGn) which are associated respectively with the first subbands ($RB_{BB}$) and second subbands ($RB_{NB}$) of the broadband portion of the broad frequency band of which a width of the first and second subbands ($RB_{BB}$, $RB_{NB}$) is deduced from a number of subbands (NRB) in a message (PBCH) supported by first and second downlink frames ($TP1_{DL}$, $TP2_{DL}$) transmitted by a first base station ($BS_{BB}$);
    detecting resource elements included at predetermined positions in the first and second subbands ($RB_{BB}$, $RB_{NB}$) of the broadband portion of the broad frequency band for each of the first and second downlink frames ($TP1_{DL}$, $TP2_{DL}$) transmitted by the first base station ($BS_{BB}$);
    grouping the resource elements respectively detected in the first and second subbands ($RB_{BB}$, $RB_{NB}$) of the broadband portion of the broad frequency band into detected subsequences (SRSDn);
    determining coefficients (Cn) which are representative of correlations between the generated subsequences (SRSGn) and the detected subsequences (SRSDn) respectively associated with the first and second subbands ($RB_{BB}$, $RB_{NB}$) of the broadband portion of the broad frequency band; and
    acquiring both positions of the first subbands ($RB_{BB}$) in the broadband portion of the broad frequency band for associated ones of the coefficients (Cn) which exceed a predetermined threshold and also positions of the second subbands ($RB_{NB}$) in the broadband portion of the broad frequency band for associated ones of the coefficients (Cn) which are at most equal to the predetermined threshold.

2. The method according to claim 1, wherein the detecting, grouping, determining and acquiring steps are performed on all the first and second subbands ($RB_{BB}$, $RB_{NB}$) in the broadband portion of the broad frequency band in order to acquire the positions of the first subbands ($RB_{BB}$) in the broadband portion of the broad frequency band for associated ones of the coefficients (Cn) which exceed the predetermined threshold and the positions of the second subbands ($RB_{NB}$) in the broadband portion of the broad frequency band for associated ones of the coefficients (Cn) which are at most equal to the predetermined threshold.

3. The method according to claim 1, wherein said broadband portion is a central band of the broad frequency band.

4. The method according to claim 3 further comprising, in the first base station ($BS_{BB}$), transferring reference signal subsequences which are to be distributed initially into all subbands of a upper band ($\Delta F_{UP}$) above the central band ($\Delta F_C$) of each of the first and second downlink frames ($TP1_{DL}$, $TP2_{DL}$) and successively into subbands of the upper band of the second downlink frame ($TP2_{DL}$) in ascending frequency order, and transferring reference signal subsequences which are to be distributed initially into all subbands of a lower band ($\Delta F_{Low}$) below the central band of each of the first and second downlink frames ($TP1_{DL}$, $TP2_{DL}$) and successively into subbands of the lower band of the second downlink frame ($TP2_{DL}$) in descending frequency order, and, in the mobile device ($MB_{BB}$), detecting resource elements included at predetermined positions in all subbands of the upper and lower bands ($\Delta F_{UP}$; $\Delta F_{LOW}$) or the period of the second downlink frame ($TP2_{DL}$) received by the mobile device ($MB_{BB}$), and grouping the resource elements respectively detected in the subbands of the upper and lower bands ($\Delta F_{UP}$; $\Delta_{LOW}$) into the detected subsequences (SRSDn), and, repeating for each of the upper and lower bands ($\Delta F_{UP}$; $\Delta F_{LOW}$), for each subband, starting with a lower subband of the upper band ($\Delta F_{UP}$) or with an upper subband of the lower band ($\Delta F_{LOW}$) the steps of:

determining a coefficient which is representative of correlation between the generated subsequences (SRSGn) associated with each of the upper and lower subbands and the detected subsequences (SRSDn) in each of the upper and lower subbands;

acquiring the position of each of the upper and lower subbands as the first subband ($RB_{BB}$) when the coefficient exceeds a second predetermined threshold, subband which follows each of the upper and lower subbands in the upper or the lower band becoming the upper and lower subbands for next recurrence; and acquiring the position of each of the upper and lower subbands as the second subband ($RB_{NB}$) when the coefficient is at most equal to the second predetermined threshold, said each of the upper and lower subbands in the upper or the lower band being maintained for the next recurrence.

5. The method according to claim 2, further comprising detecting a number ($NRB_{BB}$) of the first subbands ($RB_{BB}$) in the broadband portion of the broad frequency band in said message (PBCH) and validating the first subbands ($RB_{BB}$) occupying the acquired positions if the number of subbands (NRB) is equal to the detected number ($NRB_{BB}$) of the first subbands ($RB_{BB}$).

6. The method according to claim 2, further comprising detecting a number of the second subbands which are respectively in two complementary parts ($\Delta F_{sup}$; $\Delta F_{inf}$) in the broadband portion of the broad frequency band in said message (PBCH), and validating the acquired positions of the first and second subbands if number of the second subbands occupying positions acquired in the complementary parts are respectively equal to the detected number of the second subbands in the complementary parts.

7. The method according to claim 2, further comprising detecting a number of the second subbands which are respectively in a central band ($\Delta F_C$) and upper and lower bands ($\Delta F_{UP}$; $\Delta F_{LOW}$) making up the broadband portion of the broad frequency band in said message (PBCH), and validating the acquired positions of the first and second subbands if the number of the second subbands occupying positions acquired in the central band is equal to the detected number of the second subbands in the central band, if the number of the second subbands occupying positions acquired in the upper band is equal to the detected number of the second subbands in the upper band and if the number of the second subbands occupying positions acquired in the lower band is equal to the detected number of the second subbands in the lower band.

8. The method according to claim 1, further comprising replacing the number of the subbands (NRB) in the broad frequency band with a number ($NRB_{BB}$) of the first subbands ($RB_{BB}$) occupying the acquired positions and renumbering the first subbands ($RB_{BB}$) occupying the acquired positions.

9. A mobile device ($MB_{BB}$) for acquiring first subbands ($RB_{BB}$) in at least a broadband portion of a broad frequency band, the mobile device comprising:

a processor;

a memory;

a program code stored in the memory executed by the processor to perform a method comprising:

dividing a reference signal (RS1) generated in the mobile device ($MB_{BB}$), into generated subsequences (SRSGn) which are associated respectively with the first and second subbands ($RB_{BB}$, $RB_{NB}$) in the broadband portion of the broad frequency band of which a width of the first and second subbands ($RB_{BB}$, $RB_{NB}$) is deduced from a number (NRB) of subbands in a message (PBCH) supported by first and second downlink frames ($TP1_{DL}$, $TP2_{DL}$) transmitted by a first base station ($BS_{BB}$);

detecting resource elements included at predetermined positions in all of the first and second subbands ($RB_{BB}$, $RB_{NB}$) of the broadband portion of the broad frequency band for each of the first and second downlink frames ($TP1_{DL}$; $TP2_{DL}$) to be transmitted by the first base station ($BS_{BB}$);

grouping the resource elements respectively detected in the first and second subbands ($RB_{BB}$, $RB_{NB}$) of the broadband portion of the broad frequency band into detected subsequences (SRSDn);

determining coefficients (Cn) which are representative of correlations between the generated subsequences (SRSGn) and the detected subsequences (SRSDn) respectively associated with the first and second subbands ($RB_{BB}$, $RB_{NB}$) of the broadband portion of the broad frequency band; and acquiring positions of the first subbands ($RB_{BB}$) in the broadband portion of the broad frequency band for associated ones of the coefficients (Cn) which exceed a predetermined threshold and positions of the second subbands ($RB_{NB}$) in the broadband portion of the broad frequency band for associated ones of the coefficients (Cn) which are at most equal to the predetermined threshold.

10. A broadband radio-communications network ($R_{BB}$) comprising:

a plurality of base stations ($BS_{BB}$); and, a plurality of mobile devices ($MB_{BB}$), wherein the network ($R_{BB}$) is configured to:

divide a reference signal (RS1) generated in one of the mobile devices ($MB_{BB}$) into generated subsequences (SRSGn) which are associated respectively with the first subbands ($RB_{BB}$) and second subbands ($RB_{NB}$) of a broadband portion of a broad frequency band of which a width of the first and second subbands ($RB_{BB}$, $RB_{NB}$) is deduced from a number of subbands (NRB) in a message (PBCH) supported by first and second downlink frames ($TP1_{DL}$, $TP2_{DL}$) transmitted by one of the plurality of base stations ($BS_{BB}$);

detect resource elements included at predetermined positions in the first and second subbands of the broadband portion of the broad frequency band for each of the first and second downlink frames ($TP1_{DL}$, $TP2_{DL}$) transmitted by the one of the plurality of base stations ($BS_{BB}$);

group the resource elements respectively detected in the first and second subbands ($RB_{BB}$: $RB_{NB}$) of the broadband portion of the broad frequency band into detected subsequences (SRSDn);

determine coefficients (Cn) which are representative of correlations between the generated subsequences (SRSGn) and the detected subsequences (SRSDn) respectively associated with the first and second subbands ($RB_{BB}$, $RB_{NB}$) of the broadband portion of the broad frequency band; and acquire both positions of the first subbands ($RB_{BB}$) in the broadband portion of the broad frequency band for associated ones of the coefficients (Cn) which exceed a predetermined threshold and also positions of the second subbands ($RB_{NB}$) in the broadband portion of the broad frequency band for associated ones of the coefficients (Cn) which are at most equal to the predetermined threshold.

11. A computer program product capable of being implemented in a mobile device ($MB_{BB}$), said computer program product comprising a non-transitory computer readable storage medium storing thereon computer program instructions which carry out the steps comprising:

dividing a reference signal (RS1) generated in a mobile device ($MB_{BB}$) into generated subsequences (SRSGn) which are associated respectively with first subbands ($RB_{BB}$) and second subbands ($RB_{NB}$) of a broadband portion of a broad frequency band of which a width of the first and second subbands ($RB_{BB}$, $RB_{NB}$) is deduced from a number of subbands (NRB) in a message (PBCH) supported by frames ($TP1_{DL}$, $TP2_{DL}$) transmitted by a base station ($BS_{BB}$);

detecting resource elements included at predetermined positions in the first and second subbands of the broadband portion ($\Delta F_C$) of the broad frequency band for each of first and second downlink frames ($TP1_{DL}$, $TP2_{DL}$) transmitted by the base station ($BS_{BB}$);

grouping the resource elements respectively detected in the first and second subbands ($RB_{BB}$, $RB_{NB}$) of the broadband portion of the broad frequency band into detected subsequences (SRSDn);

determining coefficients (Cn) which are representative of correlations between the generated subsequences (SRSGn) and the detected subsequences (SRSDn) respectively associated with the first and second subbands ($RB_{BB}$, $RB_{NB}$) of the broadband portion of the broad frequency band; and acquiring both positions of the first subbands ($RB_{BB}$) in the broadband portion of the broad frequency band for associated ones of the coefficients (Cn) which exceed a predetermined threshold and also positions of the second subbands ($RB_{NB}$) in the broadband portion of the broad frequency band for associated ones of the coefficients (Cn) which are at most equal to the predetermined threshold.

\* \* \* \* \*